US008849893B2

(12) United States Patent
Goodman et al.

(10) Patent No.: US 8,849,893 B2
(45) Date of Patent: Sep. 30, 2014

(54) QUERYING A DYNAMIC DATABASE WITH AN ELECTRONIC MESSAGE DIRECTED TO SUBSCRIBERS OF A PUBLISH/SUBSCRIBE COMPUTER SERVICE

(75) Inventors: Brian D. Goodman, New Haven, CT (US); Konrad C. Lagarde, Milford, CT (US); Eben P. Stewart, Hamden, CT (US); Michael Van Der Meulen, Woodbridge, CT (US); Jessica Wu, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 840 days.

(21) Appl. No.: 11/245,577

(22) Filed: Oct. 7, 2005

(65) Prior Publication Data
US 2006/0031295 A1 Feb. 9, 2006

Related U.S. Application Data

(62) Division of application No. 10/207,685, filed on Jul. 26, 2002.

(51) Int. Cl.
*G06F 15/16* (2006.01)
*H04L 29/06* (2006.01)
*H04L 12/58* (2006.01)

(52) U.S. Cl.
CPC ............ *H04L 12/581* (2013.01); *H04L 63/104* (2013.01); *H04L 12/585* (2013.01); *H04L 51/04* (2013.01)
USPC ............ 709/203; 709/201; 709/204; 709/206

(58) Field of Classification Search
None
See application file for complete search history.

(56) References Cited

U.S. PATENT DOCUMENTS

| 5,636,344 | A | 6/1997 | Lewis ...................... 395/200.11 |
| 5,893,911 | A | 4/1999 | Piskiel et al. |
| 5,915,240 | A | 6/1999 | Karpf ................................. 705/2 |
| 6,018,716 | A | 1/2000 | Denardo et al. .................. 705/7 |
| 6,018,730 | A | 1/2000 | Nichols et al. .................. 706/45 |
| 6,028,601 | A * | 2/2000 | Machiraju et al. ............ 715/705 |

(Continued)

FOREIGN PATENT DOCUMENTS

| EP | 1130845 A2 | 9/2001 | ............. H04L 12/18 |
| EP | 1365553 A1 | 11/2003 | |

OTHER PUBLICATIONS

Microsoft Corporation (Microsoft), Internet Explorer 4.0 Accessibility, Oct. 1997.
Nguyen, T,Office Actions for U.S. Appl. No. 11/197,998, filed Aug. 26, 2005.
Nguyen, T,Office Actions for U.S. Appl. No. 10/732,020, filed Dec. 10, 2003.
Nguyen, T,Office Actions for U.S. Appl. No. 11/197,964, filed Aug. 5, 2005.

(Continued)

*Primary Examiner* — Dhairya A Patel
(74) *Attorney, Agent, or Firm* — William A. Kinnaman, Jr.

(57) ABSTRACT

A message received from a user causes a query of a dynamic database such as a FAQ or Relational Database, the results of the query are returned to the user. Furthermore the received message is published to a community of anonymous users. Optionally the user can edit the returned results and store the edited version in the dynamic database or edit the dynamic database via a GUI interface.

17 Claims, 26 Drawing Sheets

(56) References Cited

U.S. PATENT DOCUMENTS

| | | | |
|---|---|---|---|
| 6,138,120 A | 10/2000 | Gongwer et al. | 707/10 |
| 6,158,007 A | 12/2000 | Moreh et al. | |
| 6,185,603 B1 | 2/2001 | Henderson et al. | |
| 6,209,100 B1 * | 3/2001 | Robertson et al. | 726/2 |
| 6,223,165 B1 | 4/2001 | Lauffer | 705/8 |
| 6,226,359 B1 | 5/2001 | Montgomery et al. | |
| 6,286,001 B1 | 9/2001 | Walker et al. | |
| 6,341,960 B1 | 1/2002 | Frasson et al. | 434/322 |
| 6,421,709 B1 | 7/2002 | McCormick et al. | |
| 6,442,590 B1 | 8/2002 | Inala et al. | |
| 6,477,708 B1 | 11/2002 | Sawa | |
| 6,496,851 B1 * | 12/2002 | Morris et al. | 709/204 |
| 6,539,421 B1 * | 3/2003 | Appelman et al. | 709/206 |
| 6,587,668 B1 | 7/2003 | Miller et al. | |
| 6,609,103 B1 | 8/2003 | Kolls | |
| 6,651,086 B1 | 11/2003 | Manber et al. | |
| 6,941,345 B1 * | 9/2005 | Kapil et al. | 709/206 |
| 6,981,223 B2 | 12/2005 | Becker et al. | |
| 7,017,175 B2 | 3/2006 | Alao et al. | |
| 7,124,167 B1 | 10/2006 | Bellotti et al. | |
| 7,152,094 B1 | 12/2006 | Jannu et al. | |
| 7,155,475 B2 | 12/2006 | Agnoli et al. | |
| 7,188,142 B2 * | 3/2007 | Chi et al. | 709/206 |
| 7,209,964 B2 | 4/2007 | Dugan et al. | |
| 7,319,882 B2 | 1/2008 | Mandiola et al. | |
| 7,539,763 B2 | 5/2009 | Toyota et al. | |
| 7,596,578 B1 * | 9/2009 | Marks | 1/1 |
| 2001/0034015 A1 | 10/2001 | Raichur et al. | |
| 2001/0049721 A1 | 12/2001 | Blair et al. | |
| 2001/0056422 A1 | 12/2001 | Benedict, Jr. et al. | |
| 2002/0007453 A1 | 1/2002 | Nemovicher | |
| 2002/0023131 A1 * | 2/2002 | Wu et al. | 709/205 |
| 2002/0040374 A1 | 4/2002 | Kent | |
| 2002/0072039 A1 | 6/2002 | Rtischev et al. | |
| 2002/0099777 A1 | 7/2002 | Gupta et al. | |
| 2002/0131407 A1 | 9/2002 | Muhonen | |
| 2002/0138588 A1 * | 9/2002 | Leeds | 709/217 |
| 2003/0023692 A1 | 1/2003 | Moroo | |
| 2003/0028525 A1 * | 2/2003 | Santos et al. | 707/3 |
| 2003/0061365 A1 | 3/2003 | White et al. | |
| 2003/0158913 A1 | 8/2003 | Agnoli et al. | |
| 2003/0208543 A1 | 11/2003 | Enete et al. | 709/206 |
| 2003/0212800 A1 | 11/2003 | Jones et al. | |
| 2003/0217105 A1 | 11/2003 | Zircher et al. | |
| 2003/0220972 A1 | 11/2003 | Montet et al. | |
| 2004/0002049 A1 * | 1/2004 | Beavers et al. | 434/350 |
| 2004/0015554 A1 | 1/2004 | Wilson | |
| 2004/0080534 A1 | 4/2004 | Quach | |

OTHER PUBLICATIONS

Nguyen, T,Office Actions for U.S. Appl. No. 11/197,933, filed Aug. 5, 2005.
Patel, D,Office Actions for U.S. Appl. No. 10/207,685, filed Jul. 26, 2002.
Patel, D,Office Actions for U.S. Appl. No. 10/730,227, filed Dec. 8, 2003.
Patel, D,Office Actions for U.S. Appl. No. 11/226,593, filed Sep. 14, 2005.
Patel, D,Office Actions for U.S. Appl. No. 11/234,987, filed Sep. 26, 2005.
Nguyen, T,Office Actions for U.S. Appl. No. 11/197,998, filed Aug. 5, 2005.
Whipple, B,Office Actions for U.S. Appl. No. 10/685,860, filed Oct. 15, 2003.
Nguyen, T, Office Actions filed after Mar. 31, 2009 for U.S. Appl. No. 10/207,711, filed Jul. 26, 2002.
Nguyen, T, Office Actions filed after Mar. 31, 2009 for U.S. Appl. No. 10/732,020, filed Dec. 10, 2003.
Nguyen, T, Office Actions filed after Mar. 31, 2009 for U.S. Appl. No. 11/197,964, filed Aug. 5, 2005.
Nguyen, T, Office Actions filed after Mar. 31, 2009 for U.S. Appl. No. 11/197,933, filed Aug. 5, 2005.
Nguyen, T, Office Actions filed after Mar. 31, 2009 for U.S. Appl. No. 11/197,998, filed Aug. 5, 2005.
Patel, D, Office Actions filed after Mar. 31, 2009 for U.S. Appl. No. 10/207,685, filed Jul. 26, 2002.
Patel, D, Office Actions filed after Mar. 31, 2009 for U.S. Appl. No. 10/730,227, filed Dec. 8, 2003.
Patel, D, Office Actions filed after Mar. 31, 2009 for U.S. Appl. No. 11/226,593, filed Sep. 14, 2005.
Patel, D, Office Actions filed after Mar. 31, 2009 for U.S. Appl. No. 11/234,987, filed Sep. 26, 2005.
Whipple, B, Office Actions filed after Mar. 31, 2009 for U.S. Appl. No. 10/685,860, filed Oct. 15, 2003.
Patel, D, Office Actions dated Dec. 24, 2009 for U.S. Appl. No. 10/207,685, filed Jul. 26, 2002.
Patel, D, Office Action dated Dec. 10, 2009 for U.S. Appl. No. 11/234,987, filed Sep. 26, 2005.
Patel, Dhairya A, Final Action dated Feb. 22, 2010 for U.S. Appl. No. 10/730,227, filed Dec. 8, 2003.
Patel, Dhairya A, Rejection dated Aug. 18, 2010 for U.S. Appl. No. 10/730,227, filed Dec. 8, 2003.
Patel, Dhairya A, Advisory Action dated Sep. 13, 2010 for U.S. Appl. No. 11/234,987, filed Sep. 26, 2005.

* cited by examiner

US 8,849,893 B2

QUERYING A DYNAMIC DATABASE WITH AN ELECTRONIC MESSAGE DIRECTED TO SUBSCRIBERS OF A PUBLISH/SUBSCRIBE COMPUTER SERVICE

CROSS-REFERENCE TO RELATED APPLICATION

This is a divisional of U.S. patent application Ser. No. 10/207,685 "INTERACTIVE ONE TO MANY COMMUNICATION IN A COOPERATING COMMUNITY OF USERS" filed Jul. 26, 2002 and assigned to IBM. The disclosure of the forgoing application is incorporated herein by reference.

COPYRIGHT NOTICE

A portion of the disclosure of this patent document contains material which is subject to copyright protection. The copyright owner has no objection to the facsimile reproduction by anyone of the Patent and Trademark Office patent file or records, but otherwise reserves all copyright rights whatsoever.

FIELD OF THE INVENTION

The present invention is related to systems and methods for distributing data, more particularly to systems and methods for distributed computer users to enter into a two way electronic conversations using Publication/Subscription services.

BACKGROUND OF THE INVENTION

There are several ways that a requester can solicit help from a group of listeners today. He could use e-mail to send a request to a predetermined group of listeners who could each make a decision whether to engage in e-mail conversation with the requester. The problem is that e-mail's persist and have an indeterminate turn around, thus a listener may happen to see the requesters e-mail "immediately" but another listener may see the e-mail hours (or months) later. Conversing by e-mail would be very frustrating. The requester may enter a chat room to make his request, the problem is that all the members of the chat room are peers so it would be difficult to assure that listeners were interested enough to engage in conversation on a requesters subject and even if they were, the chat room would be cluttered with many users messages pertaining to many subjects all interspersed. The requester could open an instant message (IM) session with one listener at a time but he'd have to know which listener to direct the request to and wait a period for response to the listener to decide that the listener wasn't responding. Prior art methods often require the requester know the ID of the members of the community, know their interest and skills, share conversation with other requesters, take a long time to negotiate to find the appropriate listener, allow only one to one communication and the like.

FIG. 1 depicts the elements that make up a typical computer for use in networked applications. The computer 100 consists of a Base Computer 101 which comprises a processor 106, storage media such as a magnetic disk 107 and a high speed volatile main memory 105. An operating system and application programs 111 reside on the storage media 107 and are paged into main memory 105 as needed for computations performed by the processor 106. The Base computer may include optional peripheral devices including a video display 102, a printer or scanner 110, a keyboard 104, a pointing device (mouse) 103 and a connection 108 to a network 109. In a client environment, a user will interact with a (Graphical User Interface) GUI by use of a keyboard 104 and mouse 103 in conjunction with the display of information on the display 102 under control of an application program (application 1) 112. The client application program 112 will then interact with remote users by way of the network 109.

In FIG. 2 an example Internet system is shown. A user at client 1 201 uses applications on his system. This user (user 1 210) at client 1 201 can interact with clients 2-4 202-204 by way of a client server computer 206. Applications 112 may be provided by each client 201-205 and or the client server 206 or some remote server 208 by way of the network 207. The user at client 1 201 can interact with a remote user (user 5 211) at client 5 205 by way of the Internet 207.

Networked clients comprise applications for communication. E-mail applications provide for sending a message to a mail server that then makes the recipient aware of the waiting message. The recipient then can elect to open the message and view it at his client machine. E-mail messages can be sent to a single recipient or can contain a list of several recipients (one to many). One to many e-mail transactions are popular with advertisers and the use of one to many e-mails has been dubbed "SPAM-ing". Recently Instant Messaging (IM) has gained popularity in the form of sending text messages directly to another client. A first user composes an IM and selects a second user as the target. A message is then sent directly to the second user and appears on his display as either a message or the notification of a message. IMs are typically one to one messages.

A pub/sub service 304 receives messages originating from a content service and delivers them to client subscribers. An example message published includes a topic string, a set of property name-value pairs, and a body. A subscriber identifies a topic string pattern and properties test, and receives matching messages according to a standard, for instance JAVA Message Service (JMS).

SUMMARY OF THE INVENTION

An IBM marketing representative is typing away at his THINKPAD in an Atlanta, Ga. hotel room. A software developer at the Santa Teresa, Calif. Lab looks up at the clock—10 PM, only twelve hours away from product code freeze. A secretary in Somers, N.Y. is scrambling to decipher an obscure LOTUS Notes error message she received while accessing an executive's calendar.

What do these three employees have in common? They each open their Sametime Connect Instant Messaging "buddy lists" and click on the "SkillTap" Bot. A Bot is an automated assistant (robot). Bot active agents are discussed in U.S. patent application Ser. No. 10/002,685 "Accessing Information Using An Instant Messaging System" assigned to IBM and incorporated herein by reference. The SkillTap Bot can instantly deliver requests for help concurrently to an entire community of online employees. Immediately, coworkers who have elected to see SkillTap Instant Messages containing keywords of interest to them are presented an alert box with the message—they can quickly choose to respond if appropriate, or discard the alert if they are unable to deal with the request for any reason (no question asked . . . entirely anonymous so far and on a volunteer basis only).

An employee casually reading mail at home in Seattle, Wash. sees an alert pop-up on his screen from the marketing rep—"Customer in Atlanta requires immediate assistance with enabling SSL LDAP authentication under IHS/Websphere on Netfinity 4000/Linux". The words "Websphere", "Linux", and "Atlanta" are highlighted in red, based on filtering rules the Seattle employee had defined. He clicks a button to initiate a Sametime Instant Message discussion with the customer rep. "Been there, done that", "family in Atlanta area", "help at the customer site Friday, stay the weekend with family, fly you back Monday"—solutions converge quickly. The marketing rep gets a good nights sleep. The responder gets a change of scenery, some customer experience, and moves up a notch on the "Top Guns" SkillTap Scoreboard. Life is good.

So, how does this thing work, you ask? From the "requester" side, you need nothing installed beyond the Sametime Connect Instant Message client, which most employees are already using for daily instant messaging communication with other employees. Using the "People" menu, select "Add . . ." and type in Sametime User name "skilltap@us.ibm.com" to add the SkillTap Bot to your buddy list. When you have an important problem that requires immediate assistance, simply click on the Bot and ask him your question. Be sure to include enough details in the message that only users filtering on the important keywords will receive the message (e.g. Java, Websphere, AIX, SP2, zSeries, LDAP, DB2, Domino, MQ, etc.). Also, be aware that this message is potentially being delivered to a large number of users, so remember to follow basic rules of etiquette. Finally, when you are really stuck, keep in mind that no question is too simple—just think of the SkillTap community as a large room of coworkers who have all indicated a willingness to help—so, go ahead, just ask!

To be able to see questions posted by other employees, and to actively participate as a "responder", you must first download program applications to your PC. The applications are the Sash weblication called "Shotgun" and the "SkillTap" weblication, from the Web site. Next, refer to the Shotgun documentation to understand how the SkillTap application is enabled under the Shotgun client, and how to define "filters" to control which SkillTap instant messages you will receive. Once you have defined the filter words and expressions that are of interest to you (e.g. Java, Perl, Linux, AIX, zSeries, DB2, MQ, Lotus Notes, Power, wireless, etc.), just sit back and wait for coworkers to ask for your help.

Web Pub/Sub services provide for a single publisher to publish messages to large numbers of clients. The present invention (herein called "SkillTap") utilizes Pub/Sub Applications to publish an Instant Message (IM) from a requester to subscribers of a Pub/Sub channel (listeners). The listeners, running a special SkillTap application, each receive the message as an IM. In one embodiment, the published message is displayed in a special SkillTap alert window. If a listener decides to engage in conversation with the requester, he responds to the IM. The requester receives IM's from each responder in separate windows and elects one responder to converse with at a time. When the conversation is over, the requester is optionally prompted for Frequently Asked Question (FAQ) database information and/or and evaluation of the session with the listener of the conversation. Message filters are employed to allow listeners to only be alerted to messages that contain content of interest. Message throttles are employed to limit number of listeners engaging the requester.

It is therefore an object of the invention to access a dynamic database in a cooperating community of anonymous users comprising the steps of retrieving a list of approved subscribers comprising a community of users; receiving a first message from a first user, the message directed to the community of users; querying a dynamic database according to text in the first message wherein the dynamic database is modifiable by members of the community of users; and transmitting a second message comprising results of the dynamic database query to the first user.

It is a further object of the invention to generate dynamic database elements (wherein the data base is optionally a FAQ data base) in a system for instant message using a pub/sub server comprising the steps of transmitting a request message for publication to the pub/sub server Receiving a response message from a first subscriber; Selecting a data base element generation GUI option; Editing the data base element generation GUI; and incorporating the edited database element in a data base available to subscribers.

It is a further object of the invention to provide a data base GUI that includes elements of the response message.

It is a further object of the invention to provide a data base GUI that automatically includes elements of the request message.

It is a another object of the invention to include options in a data base GUI for displaying a preexisting data base element.

The above as well as additional objectives, features, and advantages of the present invention will become apparent in the following written description.

DESCRIPTION OF THE PREFERRED EMBODIMENT

The present invention provides a method for one to many communication preferably by way of Instant Messaging technology. It utilizes a novel combination of Pub/Sub service which publishes a service to subscribers wherein the subscribers elect a service channel and message filtering in order to customize the type of information presented to the subscriber. The novel combination is described in U.S. patent application Ser. No. 10/207,711 "INTERACTIVE FILTERING ELECTRONIC MESSAGES RECEIVED FROM A PUBLICATION/SUBSCRIPTION SERVICE" assigned to IBM and incorporated herein by reference.

Figure 1:
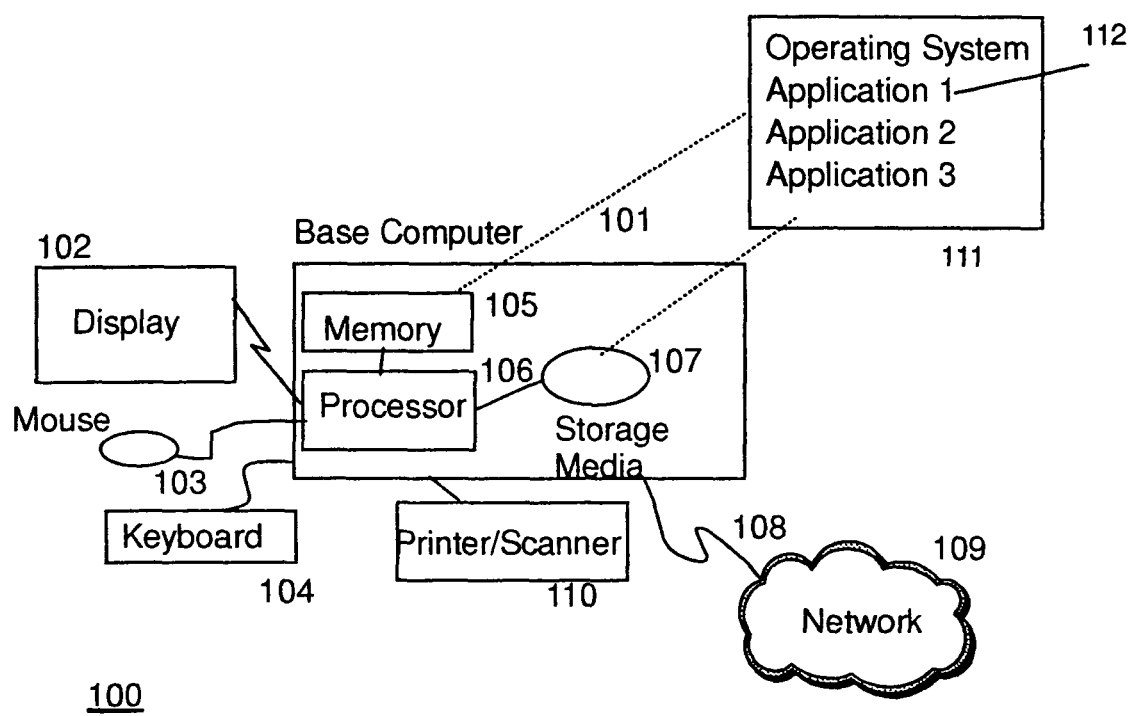
FIG. 1 is a diagram depicting a prior art computer.
Figure 2:
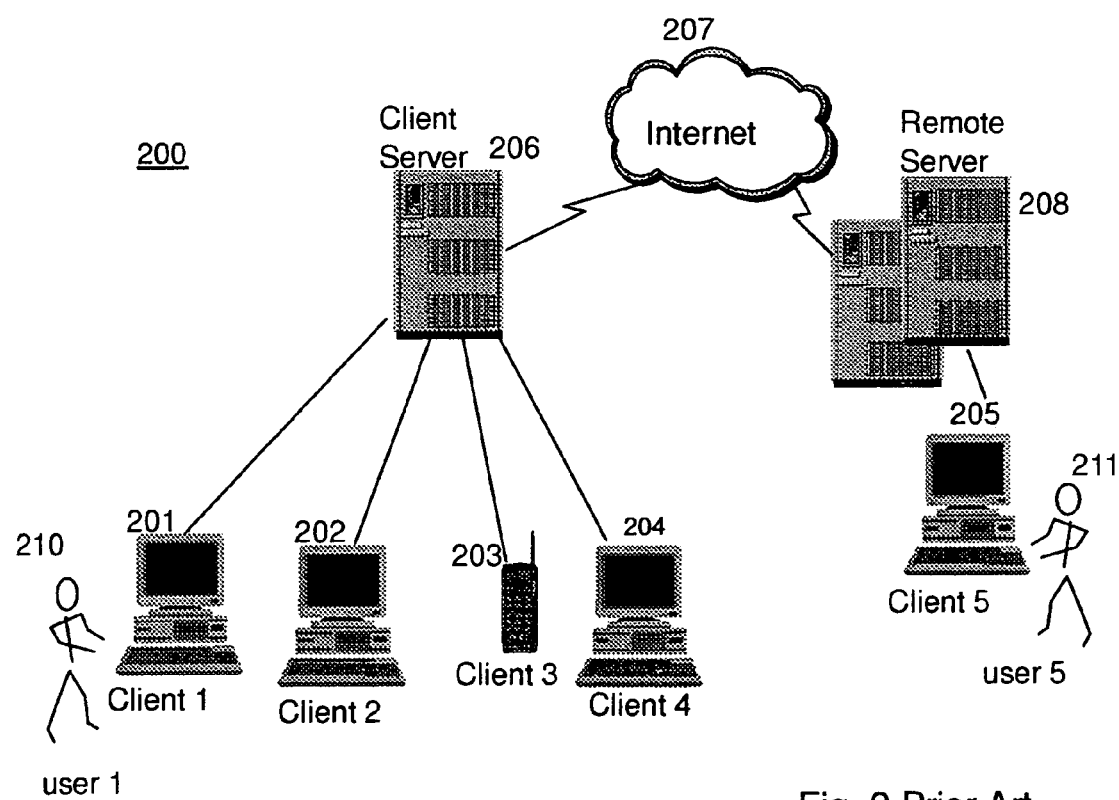
FIG. 2 is a diagram of user computers interconnected in an Internet network.
Figure 3:
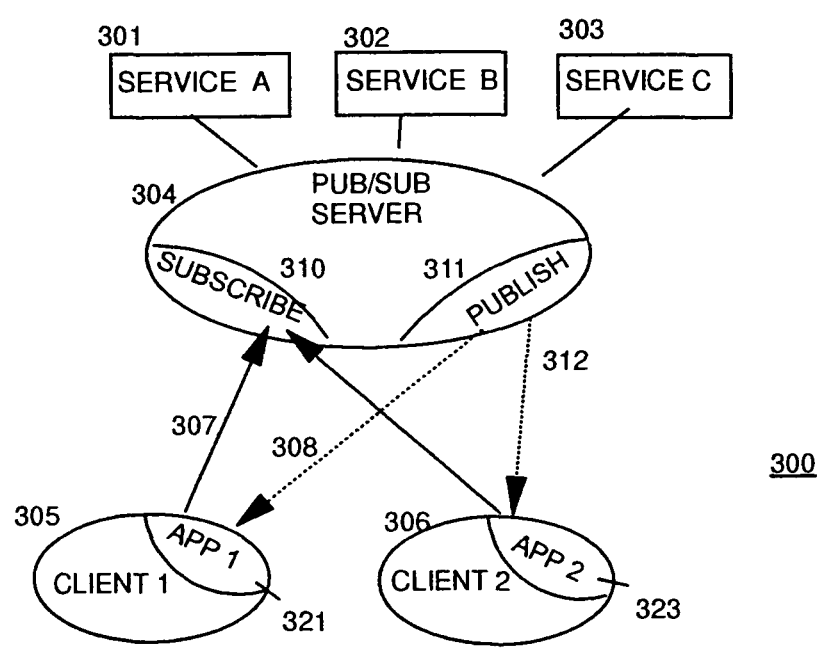
FIG. 3 is a logical depiction of a Pub/Sub implementation.

Refer to FIG. 3. The pub/sub system is made up of a Content Provider application (Service) 301-303, the Subscriber (Client) 305-306, and the Pub-Sub Service 304. Applications may implement one or more of these roles. The content provider 301-303 generates content for distribution through the pub/sub system 300. Content providers 301-303 send structured content to one or more instances of the pub/sub service 304. The subscriber 305-306 sends subscription requests 307 to an instance of the pub/sub service 304 and, subject to acceptance of a particular subscription request, receives content 308 from the pub/sub service. The actual content received will be determined by the subscription and the message selection process.

The pub/sub service 304 acts as both a subscription manager 310 and a content distribution agent 311. Applications implementing the pub/sub service role 304 accept subscription requests 307 from subscribers 305 and, subject to any applicable authentication or access control policies, accept or reject subscription requests; and distribute content 308 to valid subscribers 305.

The actual content sent to each subscriber 305-306 by the pub-sub service 304 will be determined by the subscription process 310 and through the message selection process 311.

Applications implementing some aspect of the pub/sub system may act in different roles in different circumstances. For example, an application implementing the pub/sub service role 304 may itself act as a subscriber, subscribing to and receiving content from another instance of the pub-sub service. Similarly, an application acting in the subscriber role may act as a content producer if the end-user of the application wishes to publish a message to the service.

The pub/sub system provides for communication among applications implementing the application roles. There are two primary communications in the pub/sub system: messages are sent from content providers to pub/sub services; and pub/sub services send messages to subscribers 308, 312.

Content providers 301-303 may generate messages from any content source, and subscribers may dispose of messages in any manner they choose. For example, a content provider may simply be a gateway between a raw content source, such as e-mail or web pages, to the pub-sub service. Similarly, a subscriber 305, 306 may act as a gateway between the pub-sub service and an external service such as NNTP or e-mail.

Figure 4:
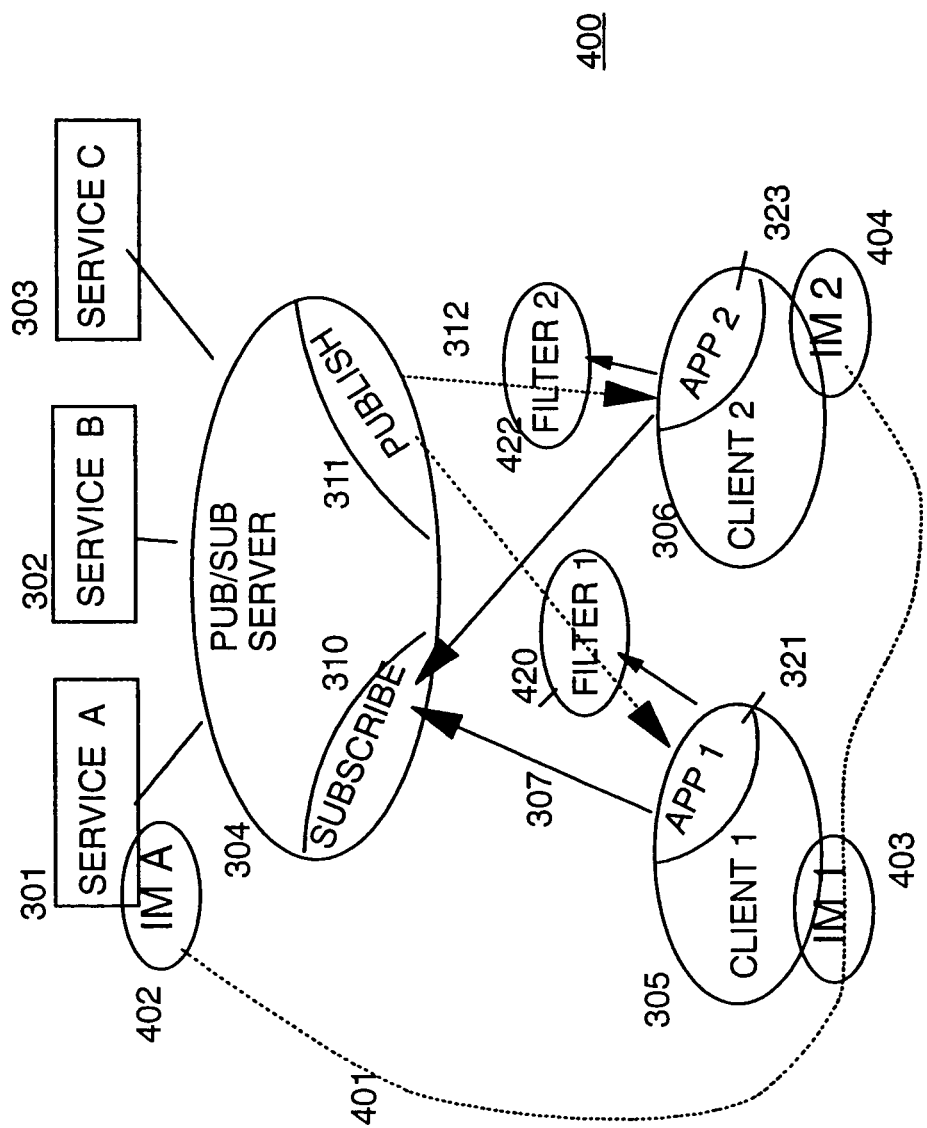
FIG. 4 is a logical depiction of a messaging system of the present invention.

FIG. 4 depicts a logical representation of components of the present invention. The system enables a client to send an IM to an automated client (Bot). Bots used to present an interface to program applications are described in U.S. patent application Ser. No. 10/002,685 "Accessing Information Using An Instant Messaging System" assigned to IBM and incorporated herein by reference. The client Bot re-sends the message to many listeners. The listeners each receive a special IM window. When a listener responds to the requester using his special window for the transaction, a new special IM window is presented to the requester. This completes the one to one IM connection between the requester and one of the listeners. The requester elects to commence conversation with a responding listener by using the Im window assigned to that listener's response. Other embodiments enable window sharing for multiple listeners responding to the same request or prompt the requester in a single GUI displaying listeners responding to a request in order that the requester can elect to open windows associated with the responding listeners.

More specifically, Clients 305-306 have downloaded App 1 (321) and App 2 (323) which enable message filtering 420 for message published 311 by a Pub/Sub service 304. One component of Service A (301) includes an automated IM user (Bot) 402 which communicates to other applications 403-404 using IM technology. Service A (301) associates the Bot with a Pub/Sub channel. The Bot is represented to the community by an IM ID as if it were another user. Clients can be requesters or listeners or both. Requesters initiate requests to Service A's Bot exactly as in any IM initial event. Service A's Bot ID is associated with a Pub/Sub channel which has a plurality of subscriber clients (listeners). Listeners have subscribed to the Bot channel because they have common interests. The subscribers' IM ID's are preferably unknown to the requester. SkillTap associates subscribers with a channel by use of a table holding the information at the SkillTap server.

Service A's Bot (402) receives an IM from a requester's 305 IM session 403 and publishes it 311 to the active subscribers of the Pub/Sub channel associated with the Bot including client 2 (306). The requester's 305 IM window may then be closed. The Pub/Sub service 304 distributes messages to SkillTap applications running on client machines. One of these applications, App 2 provides filtering techniques on incoming messages to eliminate messages that are not of interest to the client 2. App 2 (323) presents the request message to the listener user's display at client 2 (306). In one embodiment, the display at client 2 is like an IM display. If the listener is interested in responding, he transmits a response special IM by typing text in the displayed window. App 2 (323) uses IM 404 to transmit the message to the requester at client 1 (305). App 1 at client 1 (305) intercepts the response message and opens up a special IM window on the requester's display. This completes the negotiation from the requester for an IM session with a group of listeners. Communication between the two special IM windows continues until one window is closed.

It should be noted that in the preferred embodiment, the SkillTap client provides a "special IM" GUI that is used to provide the special SkillTap features. In the preferred embodiment, the initial request uses a standard IM GUI which is closed after transmitting the request. The requester receives responses from listeners in standard IM GUI. Thus a requester needs any IM service to initiate a SkillTap request and a special SkillTap IM application for the listening function. Another embodiment would provide all IM services in the special SkillTap IM application. These and other embodiments of the present invention could be created by one skilled in the art after learning the example embodiments herein.

Example of a Preferred Embodiment

In the example that follows, Brian has installed an IM (instant messaging) application on his PC. He adds a user name "SkillTap@us.ibm.com" to his IM buddy list. In this case, SkillTap is not the name of a person, it is the name of an automated user robot (Bot) that receives and sends IMs as if it were any other user. The Bot also communicates with a Pub/Sub service as a content provider. Brian sends a request to "listeners" for information. Brian doesn't know who is listening specifically but he does know that they subscribe to the SkillTap Service. Mike, a "listener" has downloaded an application called Shotgun. Shotgun in this case is an IBM SASH Weblication from an IBM Web site. Mike has also downloaded the SkillTap weblication. The SkillTap application is enabled under the Shotgun client. Mike uses Shotgun Documentation to understand how the SkillTap application works. Mike has defined Shotgun Filters for his SkillTap channel to limit messages to topics of his interest and expertise the Filters base their decision to present messages directed to SkillTap to listeners based on the content of the messages.

Shotgun receives IMs directed to predetermined services (SkillTap Bot in this case) and enables the service to publish messages via channels to subscribers (listeners in this case). Listeners may respond by returning an IM to the requester (Brian). The return messages opens an IM window on Brian's computer which initiates the IM conversation between Brian and Mike. In another embodiment, the return message opens a chat room and Brian selectively engages in IM conversations with multiple listeners via the chat room. The chat room enables multiple listeners to participate in the conversation, it allows multiple listeners to view the conversation between Brian and Mike or optionally only provides Brian with a single instance of an IM window to converse with multiple listeners wherein each listener only sees conversation directed to him. Many other window variations would be useful and become obvious in light of the present invention.

Figure 5:
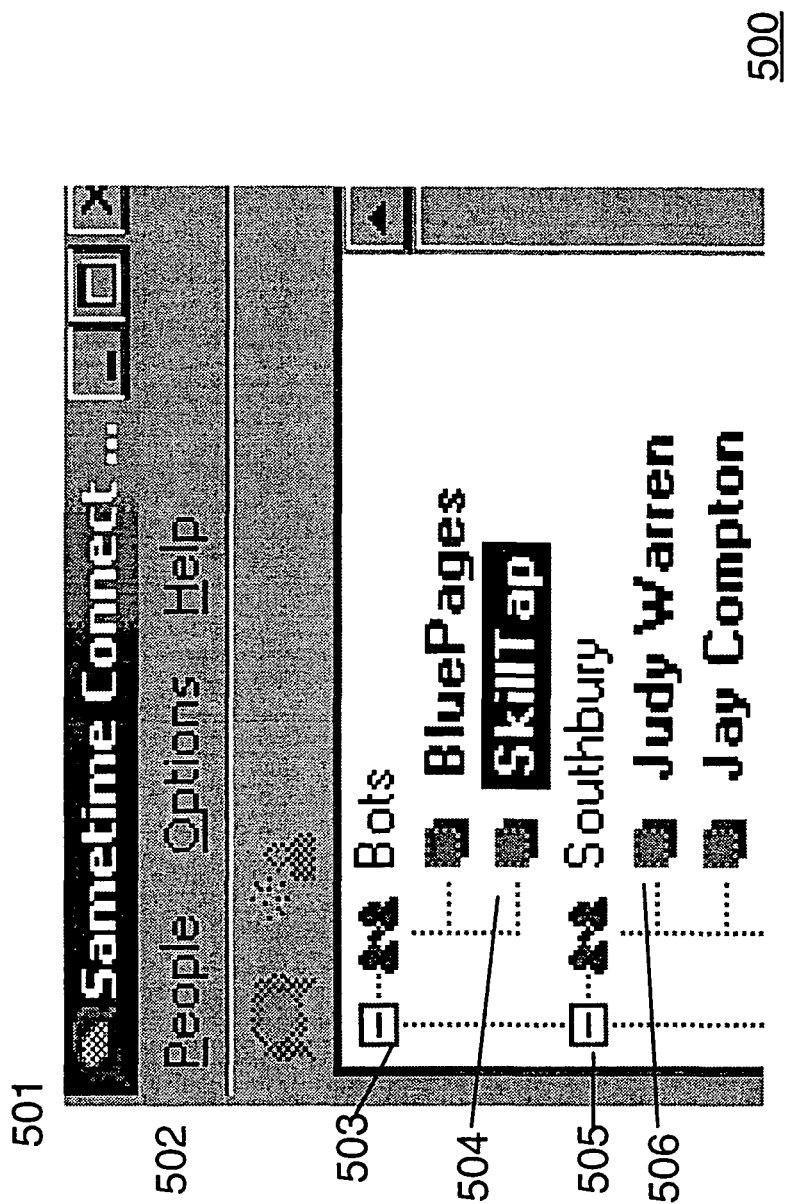
FIG. 5 is a GUI view of an IM window employing the invention.

An embodiment is demonstrated in the following example. In FIG. 5, Brian, a marketing rep clicks on the "SkillTap" Bot 504 in his Instant Messaging (IM) Sometime window 501.

Figure 6:
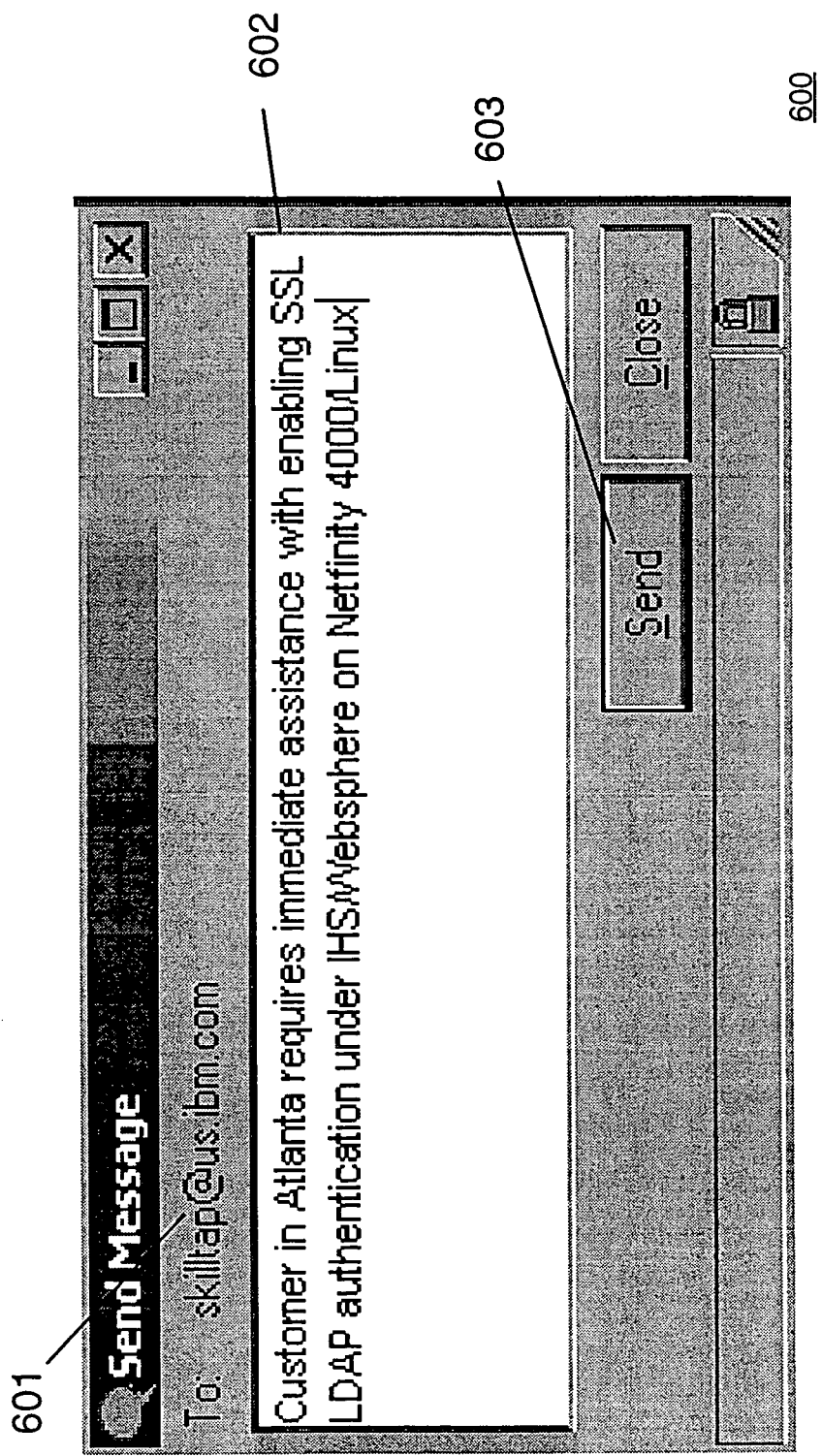
FIG. 6 is a requester's IM window for broadcasting.

In the resulting IM window shown in FIG. 6, Brian defines a problem 602 and sends 603 a request to the SkillTap Bot 601 for publication to a group of users currently running the Shotgun client. The SkillTap service application publishes (via a Pub/Sub service) Brian's message to a predefined group of active clients.

Figure 7:
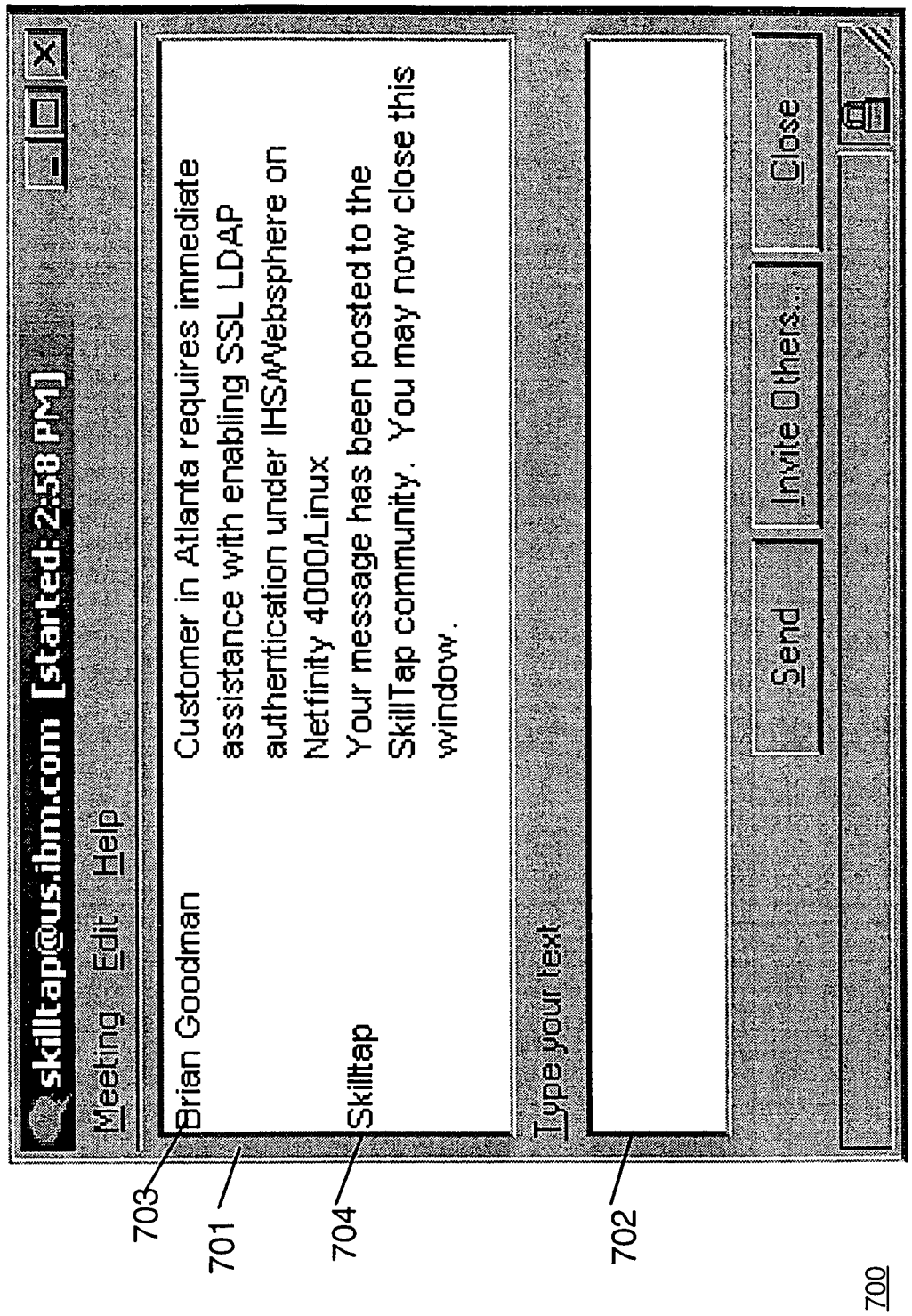
FIG. 7 is a requester's IM window with a listener's response.

In FIG. 7, the SkillTap service responds to Brian's request with an acknowledgment 704 that the request message 703 has been successfully delivered to the community of active listeners. SkillTap imitates a knowledgeable client in one embodiment by returning messages from a FAQ database using artificial intelligence querying known in the art. In another preferred embodiment, SkillTap returns procedural information or prompts such as instructions to close the present window.

Figure 8:
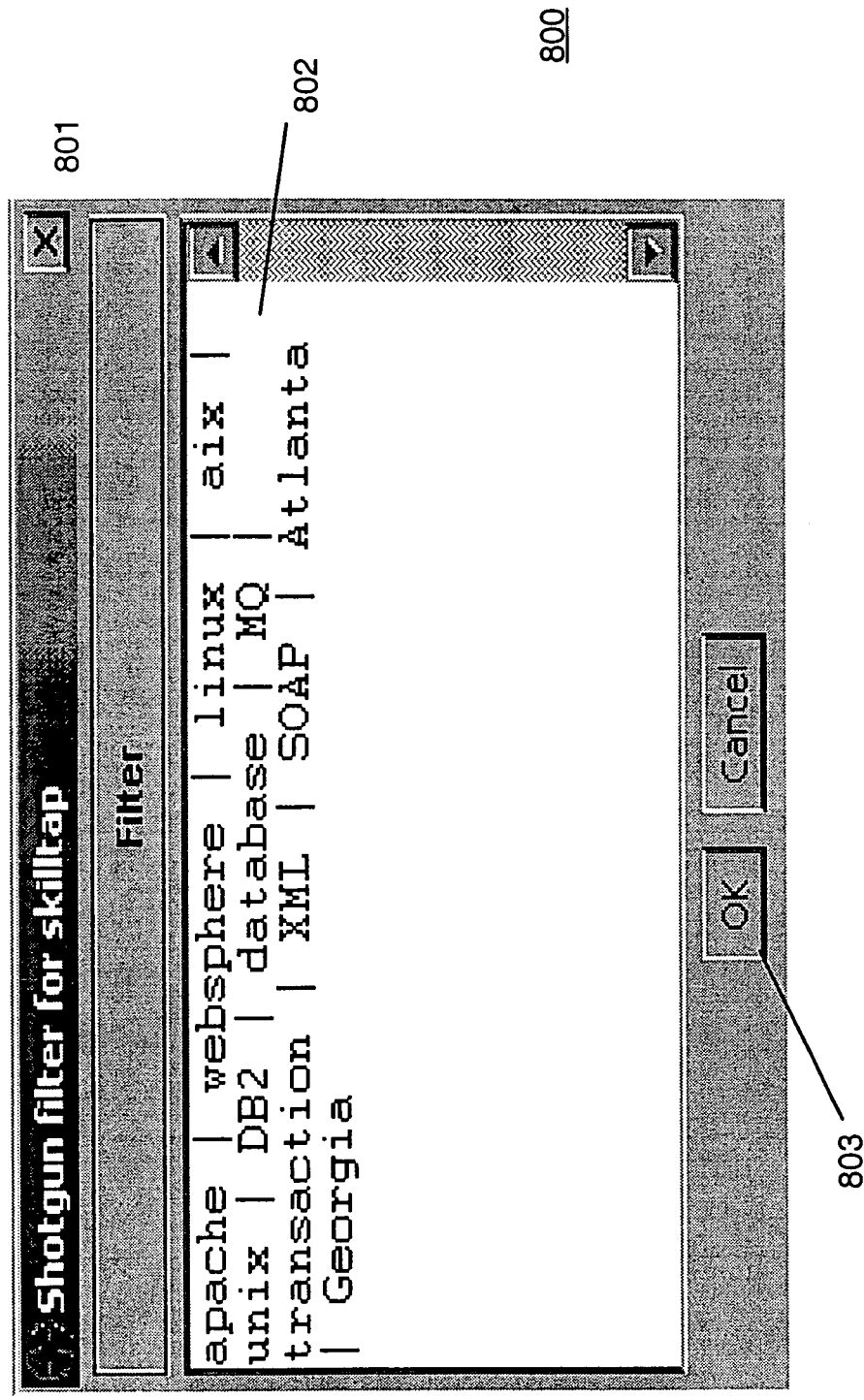
FIG. 8 is a listener's IM filter creation window.

In FIG. 8, an example filter window 801 is shown. Shotgun users subscribing to the SkillTap service are permitted to define message content filters. The example filter 802 of FIG. 8 shows a boolean list of keywords or'd together. The boolean "OR" is depicted by "|". The filter defines the user's areas of interest or expertise. In the example, the user has entered "Atlanta" because he is interested in what's happening in his hometown of Atlanta. When Brian sent his request, the words in his request would have to pass the listener's filter in order for the listener to see the request.

Figure 9:
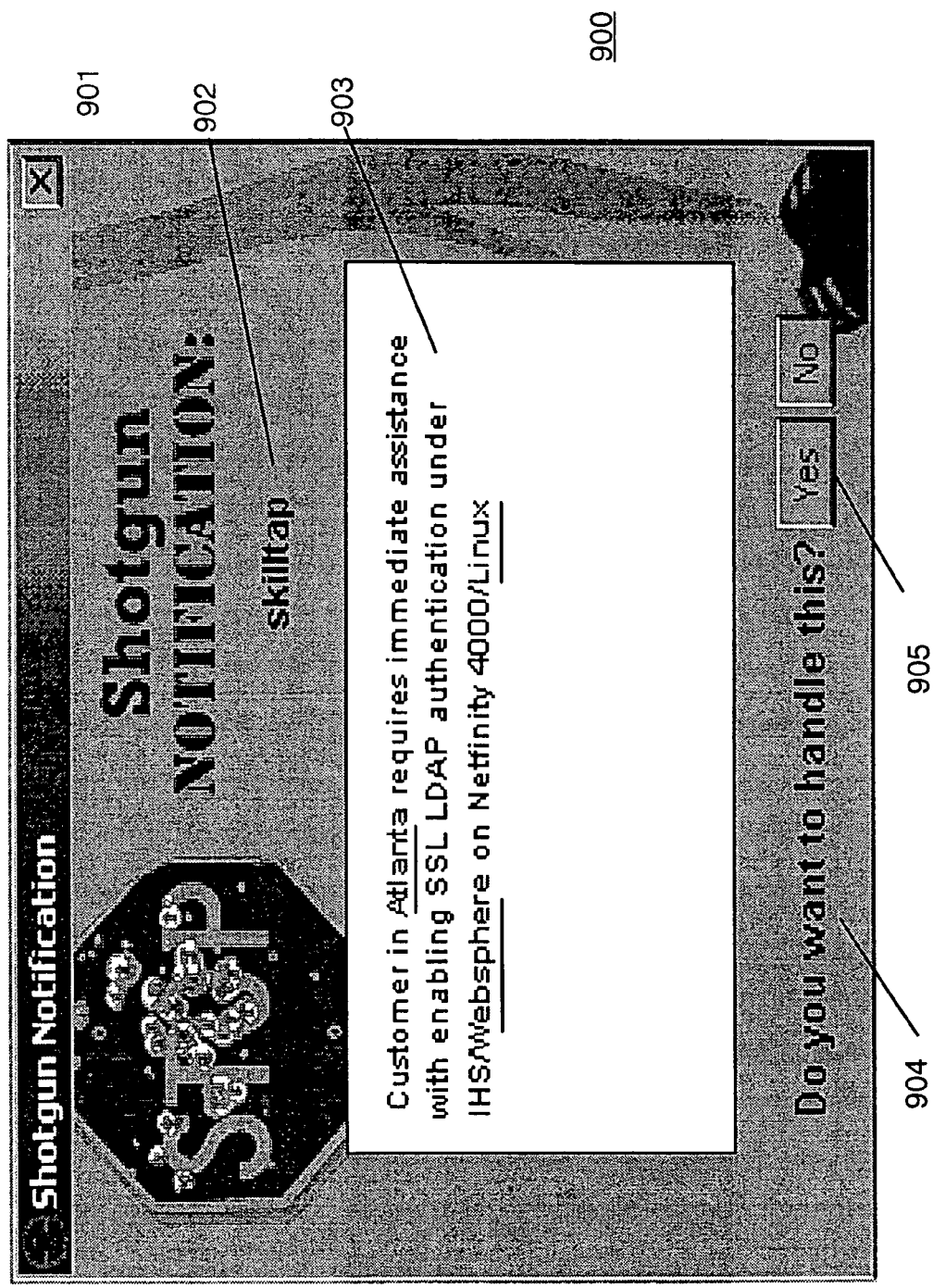
FIG. 9 is a listener's alert window highlighted according to his filter.

In FIG. 9, if the request passes the filter test, a Shotgun notification 901 immediately appears on the listener's screen. In the example, the filter keywords 903 "Atlanta", "Websphere" and "Linux" are highlighted in the message. The window in the preferred embodiment also identifies the SkillTap service 902 as the Channel and supplies radio buttons for actions to be taken. In the example, the listener is asked if he wants to "Handle" this request. If he hits the No radio button, the operation is aborted.

Figure 10:
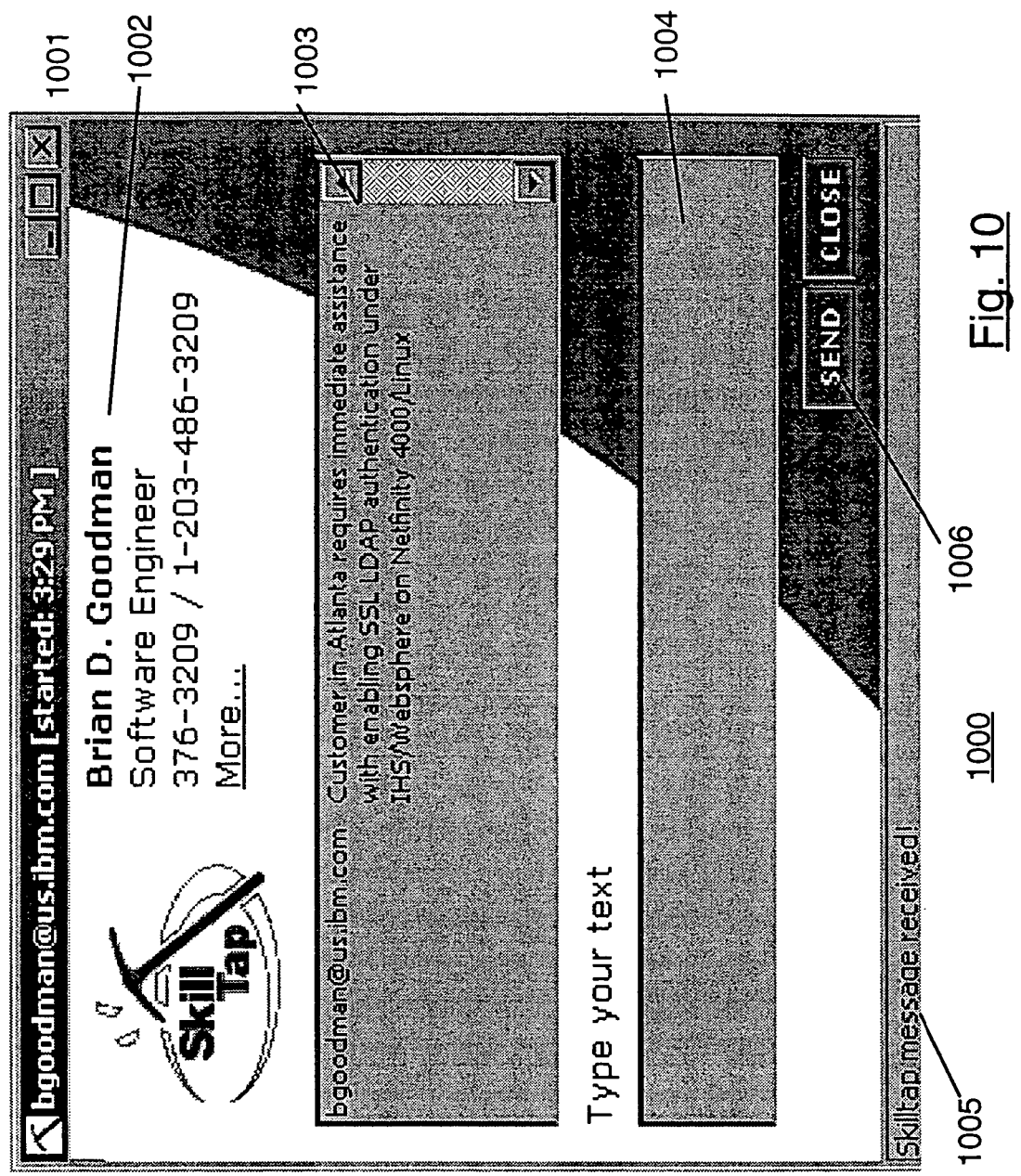
FIG. 10 is a listener's window comprising the initial request.

If the listener wants to proceed, he hits "Yes" and the window depicted in FIG. 10 is displayed. This window 1000 is similar to any IM window. In the preferred embodiment the window shows additional information about the requester 1002, in this case Brian's name, occupation, phone number and a hyperlink for more information about Brian. The information having been retrieved from data bases or subscription information. The listener is presented with the request message in the top field and in a second field is provided a place to type his response. His response includes text only or in another embodiment, the listener provides a link to image, audio or video information or any other media known in the art. Once the listener has typed his response he hits the "Send" UI (User Interface) button.

Figure 11:
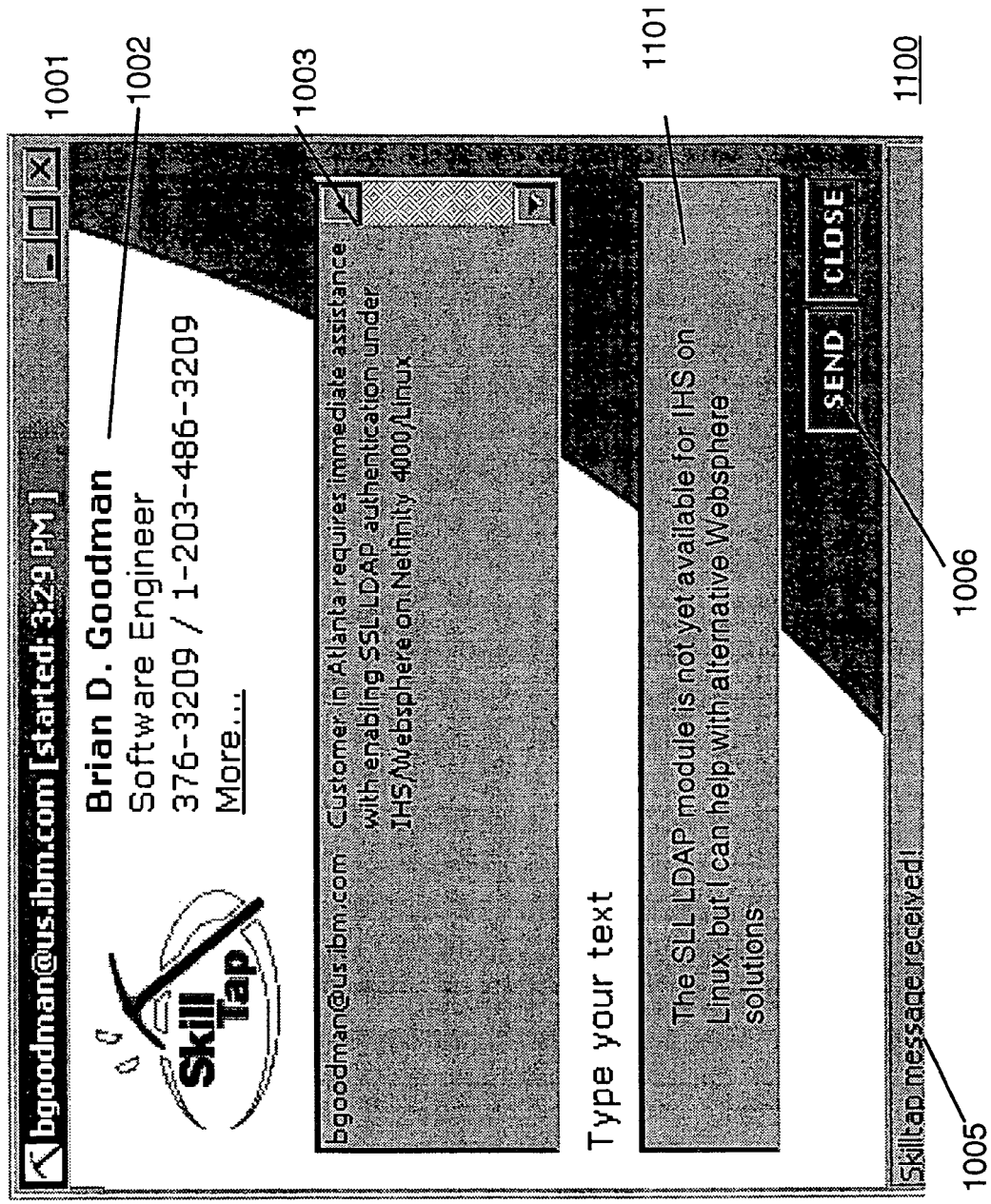
FIG. 11 is a listener's Im window comprising the listener's response text.

FIG. 11 shows the listener's window after he has entered his response 1101.

Figure 12:
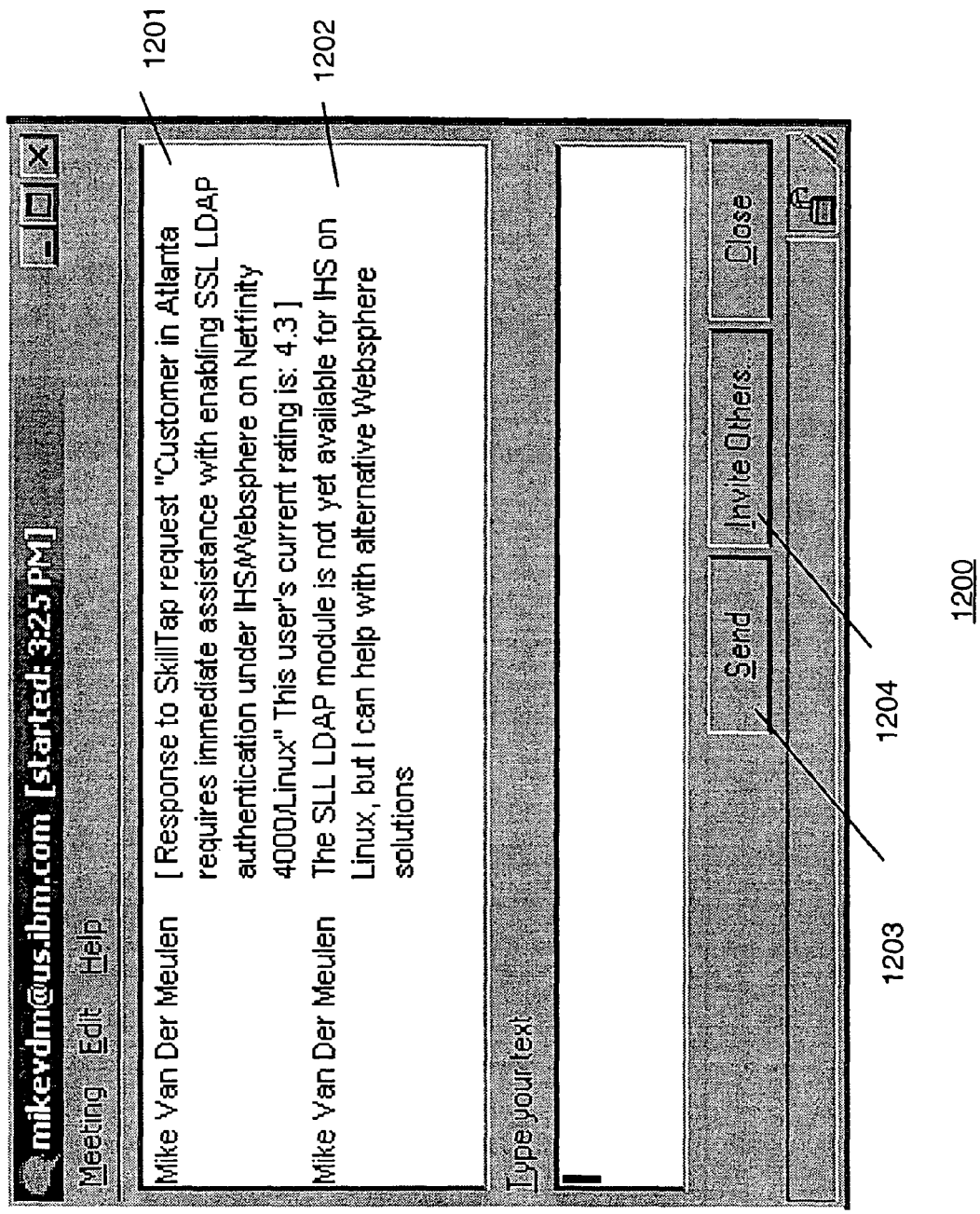
FIG. 12 is the requester's IM window opened by the listener's first response.

FIG. 12 shows Brian's window after receiving one response. Note that in a preferred embodiment, Brian is reminded by SkillTap of his original request and that the IM transactions relate to that request. If Brian wanted to begin a new request, a new set of windows would be created and each one would remind Brian of the topic of his request. Part of the SkillTap service function is to provide an indication of the value of the responding listener's credentials. In the embodiment shown, the SkillTap application has asked past requesters to rate responding listener's on a 1-5 basis. The responder "Mike Van Der Meulen" in the example currently has an accumulated rating value of 4.3. The responses from Listeners open normal IM windows at the requesters' terminal, in this case IBM Sametime IM. In one embodiment, Brian elects to have one IM window displaying conversations related to his first request from multiple listeners. In a preferred embodiment, the SkillTap application allows Brian to use his mouse to drag a conversation window into another conversation window. The resulting new combination window displays messages from both listeners in a single window. Similarly, Brian uses his mouse to drag a user's message out of the window which creates a new conversation window for that conversation and optionally eliminates the dragged user from the original window.

Figure 13:
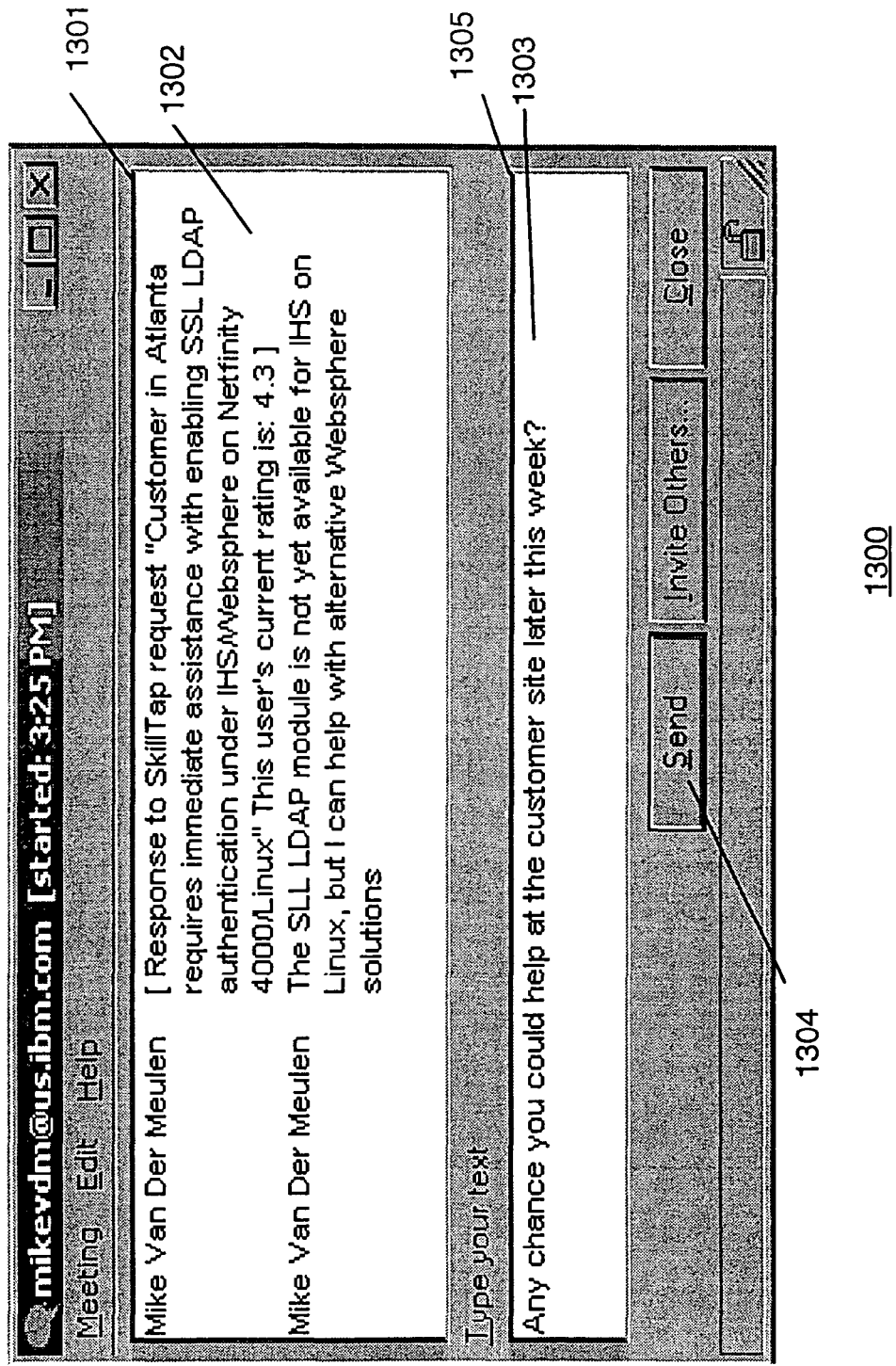
FIG. 13 is the requester's IM window including a reply to the listener's message.

In FIG. 13, Brian continues the communication by entering his IM text directed to Mike. In another embodiment, continued negotiations via IMs are broadcast to all listeners.

Figure 14:
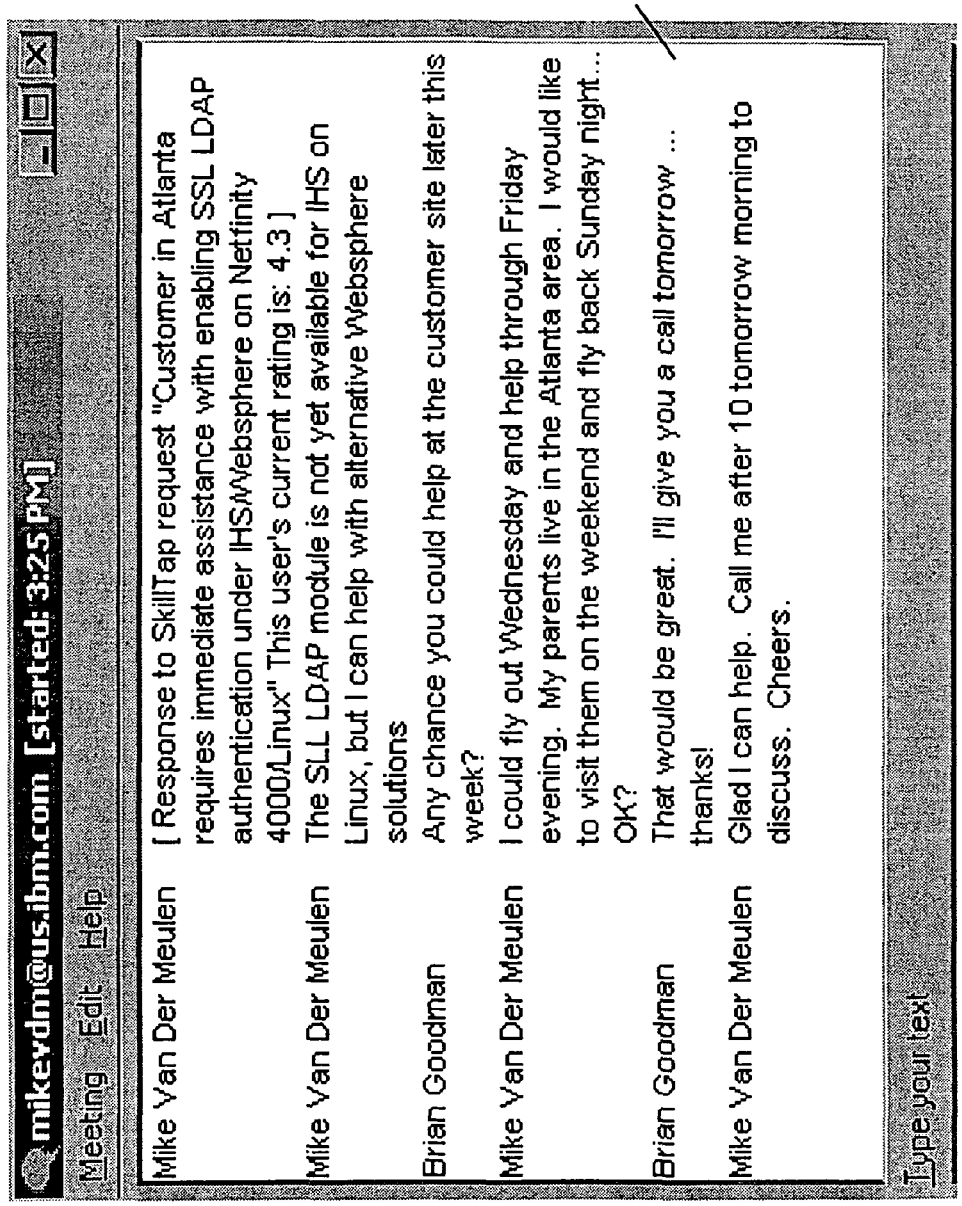
FIG. 14 is the IM window comprising the session communication.

FIG. 14 shows Brian's IM window after all negotiations with Mike have been completed. Brian closes this window to end communications.

Figure 15:
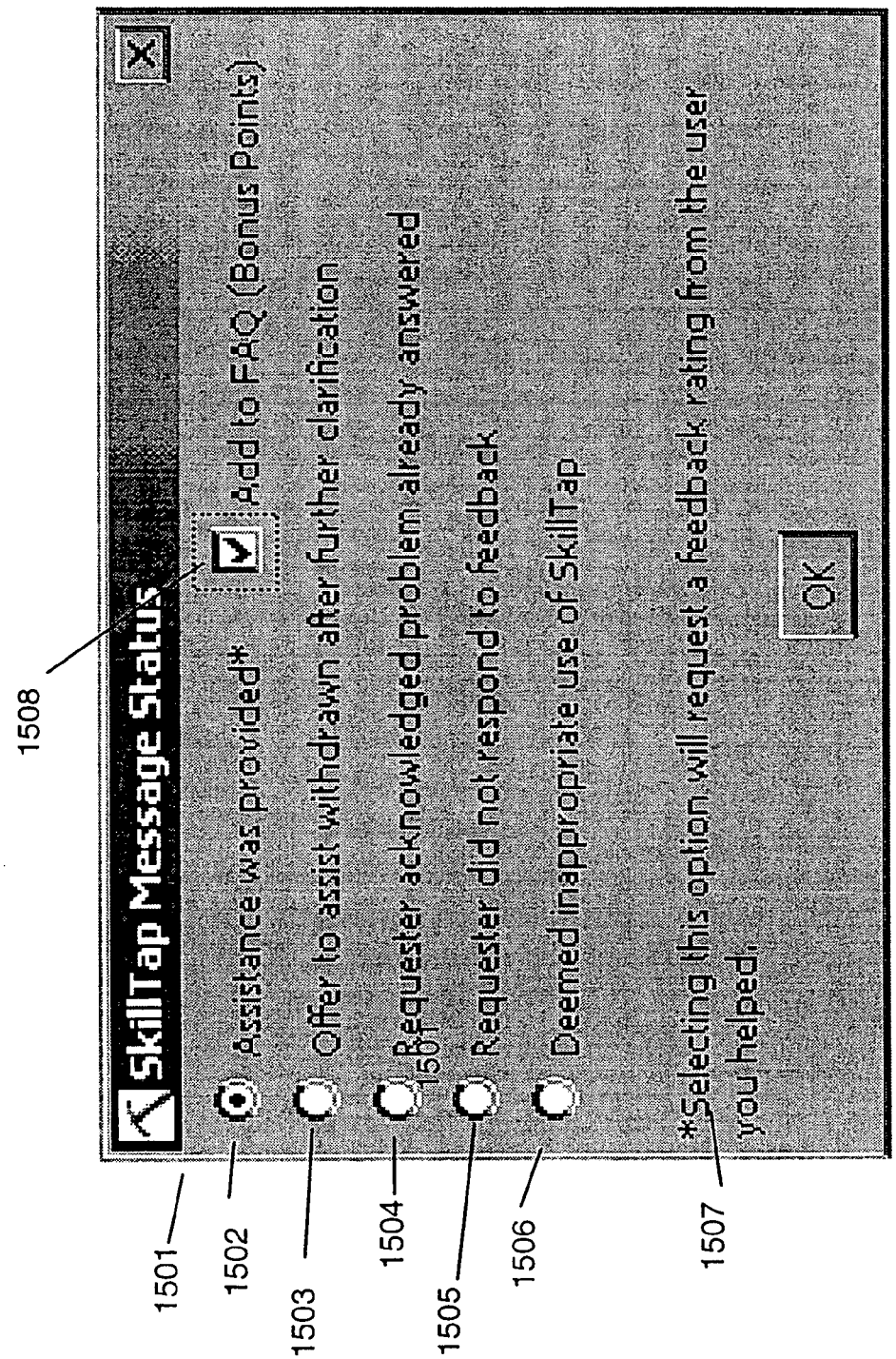
FIG. 15 is an optional requester window opened at conclusion of a session.

FIG. 15 depicts a preferred embodiment of a method for the SkillTap service to assess the value of the responder's participation. In the example, a window appears when the conversation is closed. The window permits the requester to select from a list of predetermined categories. In the example, Brian selects "Assistance was provided*". He also checks the "Add to FAQ" function.

Figure 16:
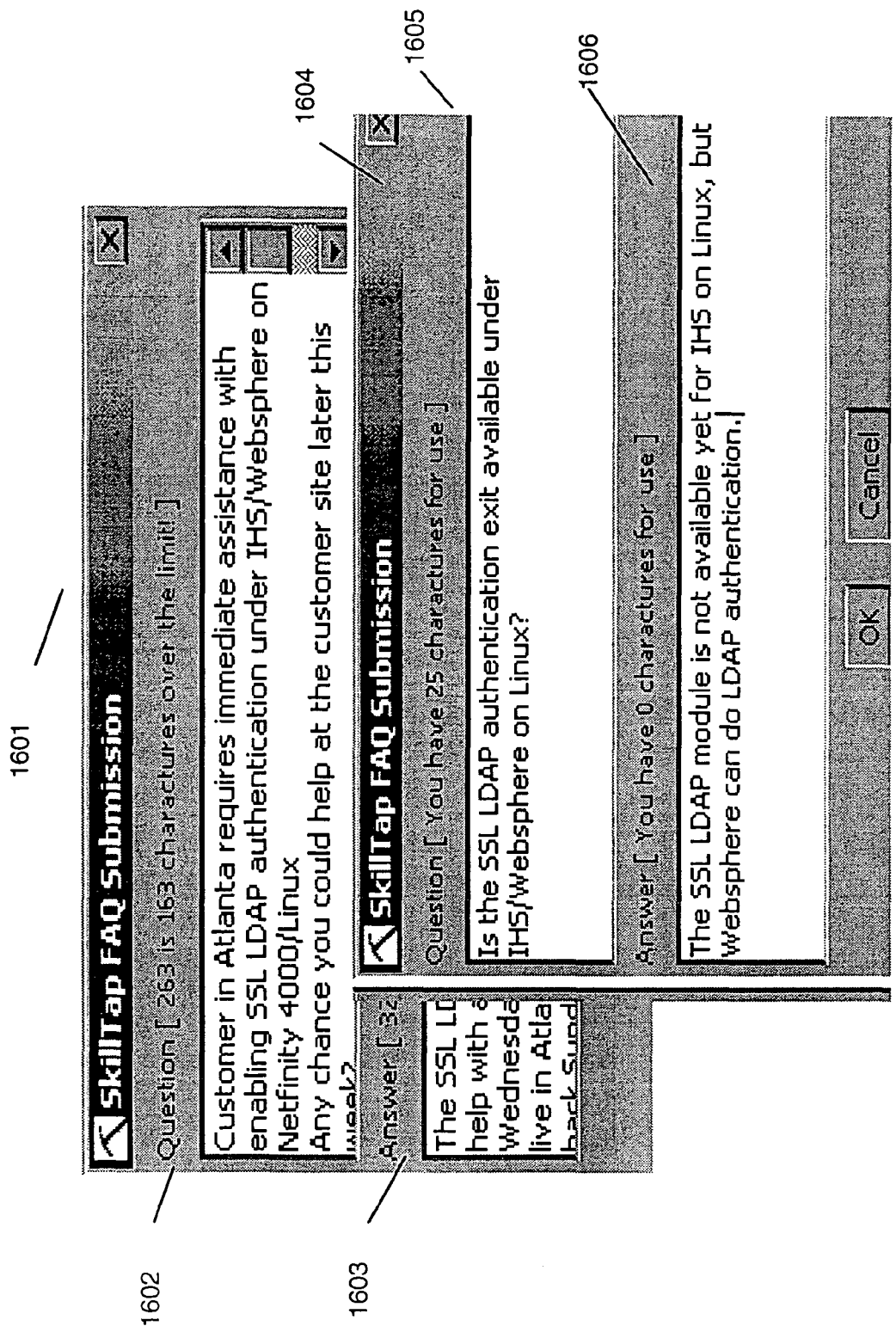
FIG. 16 is a requester window for creating a FAQ.

In the next window of the example, FIG. 16 shows an embodiment of a FAQ creation window. In this embodiment, Brian is presented two fields, one containing text from Brian and the other containing text from Mike. Brian edits these windows (or in another embodiment, types into new windows) to create a brief paraphrase of the question and a brief paraphrase of the answer. In one embodiment of the present invention, Brian's value rating is increased by creating the FAQ. This is an incentive for Brian since his value rating will be seen when he is a responder listener to a request from another user.

Figure 17:
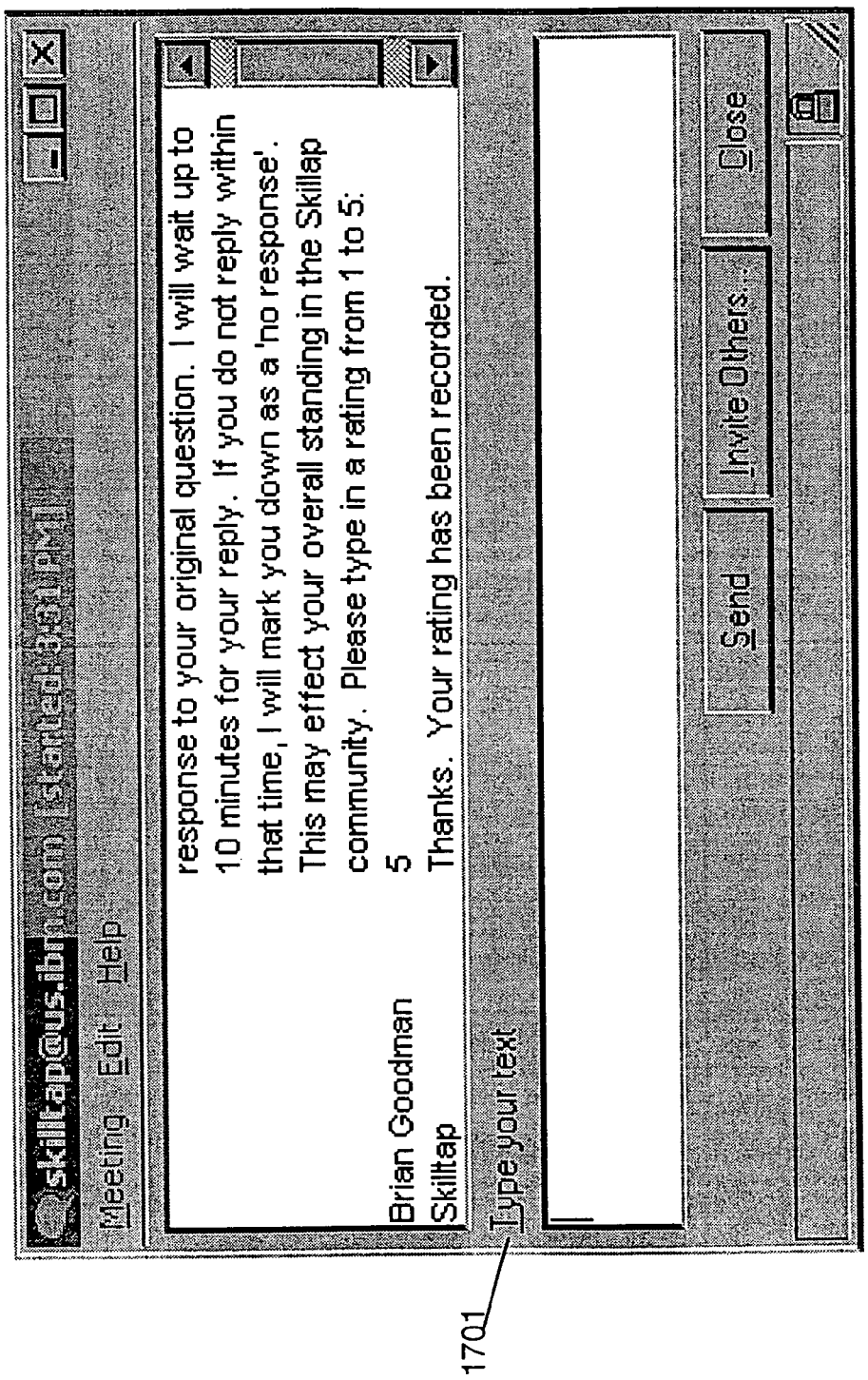
FIG. 17 is an automated message requesting a value rating from the requester.

FIG. 17, shows SkillTap (an agent program Bot) asking Brian to rate Mike's response and explains the criteria. Mike's rating is provided to the SkillTap service and will be provided with Mike's response to future listening. In one embodiment, the value rating of listeners is used to prioritize responses from listeners.

In one embodiment, users can see their relative value rating by asking SkillTap for their standing. Mike, for instance could see that he is currently the 10th rated listener overall.

In another embodiment of the present invention, a SkillTap application optionally receives messages or publishes messages other than IMs. Messages can be transmitted/received using any media including for example: telephone, wireless, personal devices, voice to text, text to voice or automated applications. Messages can include attachments of image, audio, video, program applications, network invoking mechanisms (including hyperlinks, Web URLs) and the like.

In one embodiment, SkillTap comprises a throttling means to limit the number of messages. Responses to the requester are limited by any of a predetermined number of messages, a predetermined time window, a predetermined algorithm of priority (based on message content) or message sender's credentials and the like.

In another embodiment, SkillTap prioritizes publication of the request such that an initial publication goes to one set of listeners, a second publication goes to another set of listeners. The decision to publish to sets of listeners is either time based, response based, or explicitly requested by the requester.

In a preferred embodiment, SkillTap first sends the request to an active agent that queries a database for responses. The database is preferably a FAQ database but in another implementation, may be a query on cached responses accumulated from other SkillTap sessions.

In a preferred implementation, SkillTap requests include keywords to direct SkillTap action. A question to listeners uses "Ask"; a question to FAQ uses "FAQ", an IM to SkillTap to set parameters or controls uses "PARM". In another implementation, SkillTap interacts with the requester. For example, the requester submits a question using "Ask" and SkillTap responds with a list of groups for the request to be directed to such as "All", "US", "Japan", "Hardware", "Programmer", "Marketing", "FAQ". The requester responds with his selection and SkillTap then broadcasts the request to the selected group of listeners.

Figure 18:
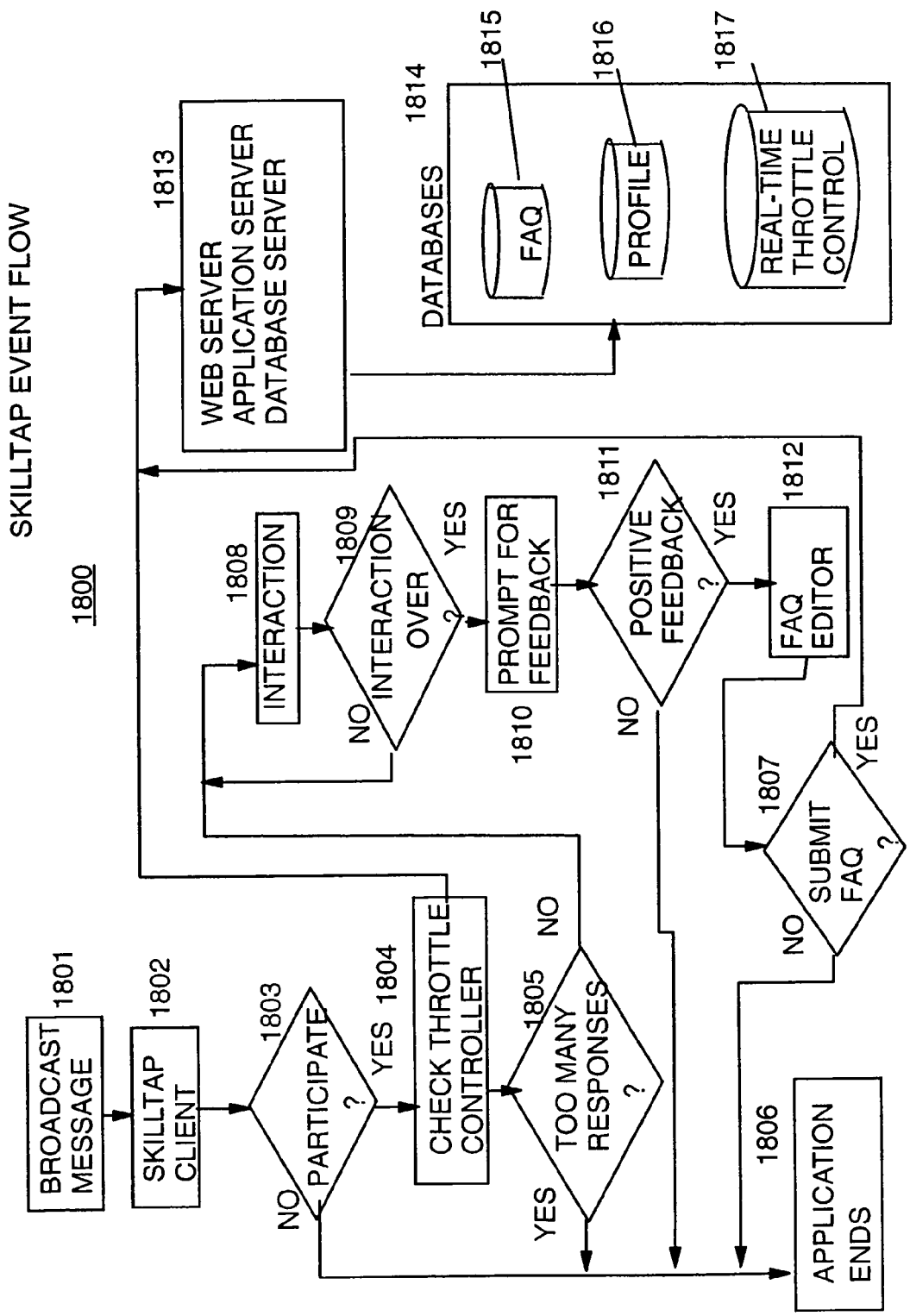
FIG. 18 is a flowchart of the events of an embodiment of the invention.

FIG. 18 depicts a flowchart of the SkillTap events. The requesters message is broadcast 1801 (published) to SkillTap client applications 1802 (listeners) that have subscribed to SkillTap. The SkillTap client application looks at the message and decides whether to present it to the user (listener). If the user decides to participate 1803, he sends a response message. The SkillTap throttle controller 1804 checks to determine if the throttle threshold has been met using parameters in the database 1817. If there aren't too many responders, interaction is enabled 1808 between the requester and responder(s). When the requester finishes his interaction 1809, he is prompted for feedback 1810 about the value of the responder. If the requester elects 1811 to create a FAQ entry, he does so using the FAQ editor 1812. When the FAQ is complete, it is submitted 1807 to the database 1815.

Figure 19:
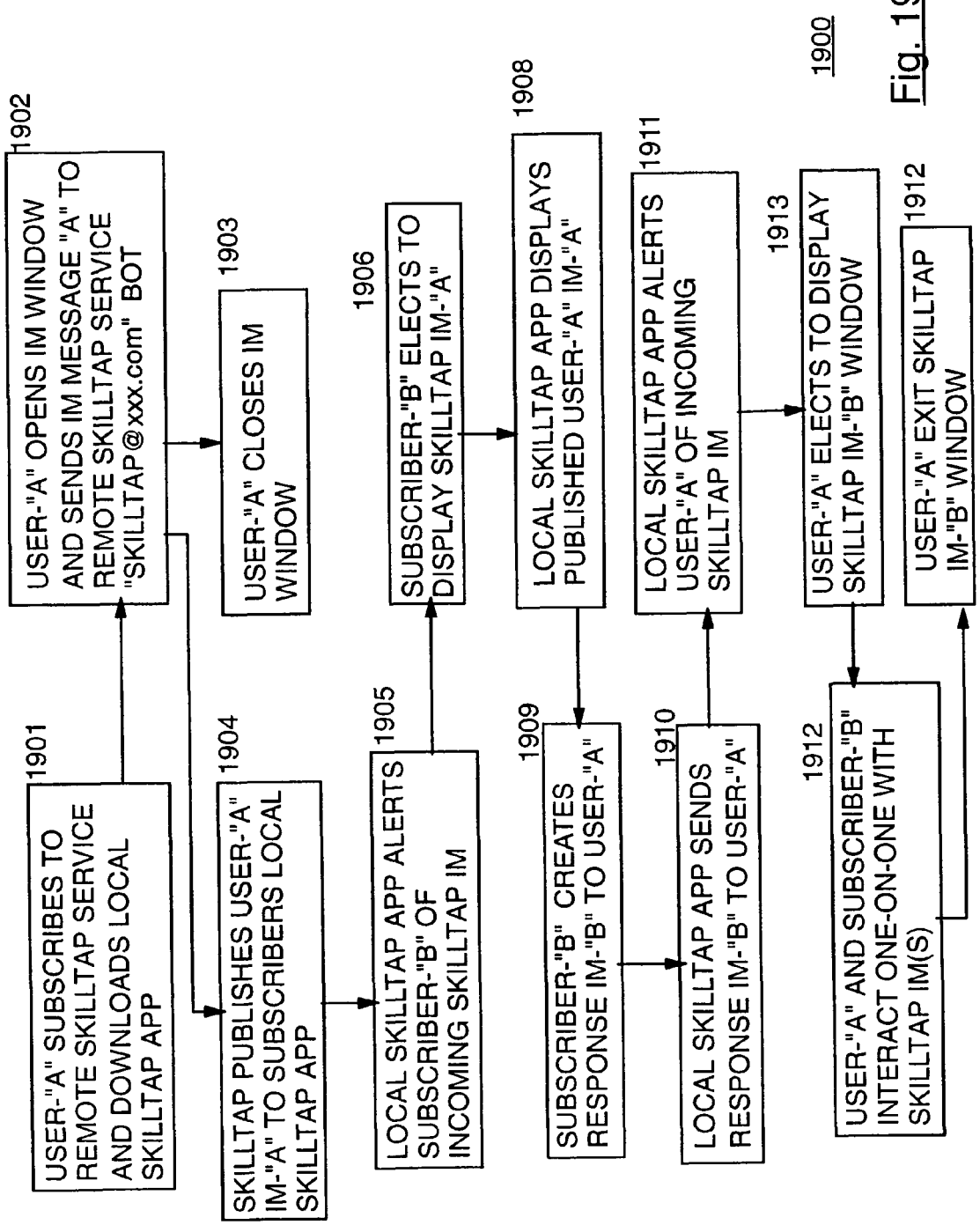
FIG. 19 is a flowchart depicting function of the invention.

FIG. 19 depicts the major events of setting up a skilltap channel, broadcasting a communication request via a pub/sub engine, engaging in communication with a subscriber to the skilltap channel and closing a communication session.

A User "A" wishes to participate in skilltap group communication. He downloads to his client a local skilltap application 1901. He also downloads a shotgun application (may be part of the download of skilltap). Shotgun provides the GUI for subscribing to a channel of skilltap and for setting up message options such as filters, throttles and the like for skilltap messages. The Shotgun server maintains a list of subscribers for each channel. When a new subscriber joins the channel, he is authenticated and authorized and his network address is added to the list of approved subscriber for the channel (the channel's community of users). A user can use the GUI at any time to join or leave a Channel or alter his options. The user uses the GUI to get authorization to subscribe and/or publish for each channel. He is authenticated and approved based on credentials required by the specific implementation.

Figure 20:
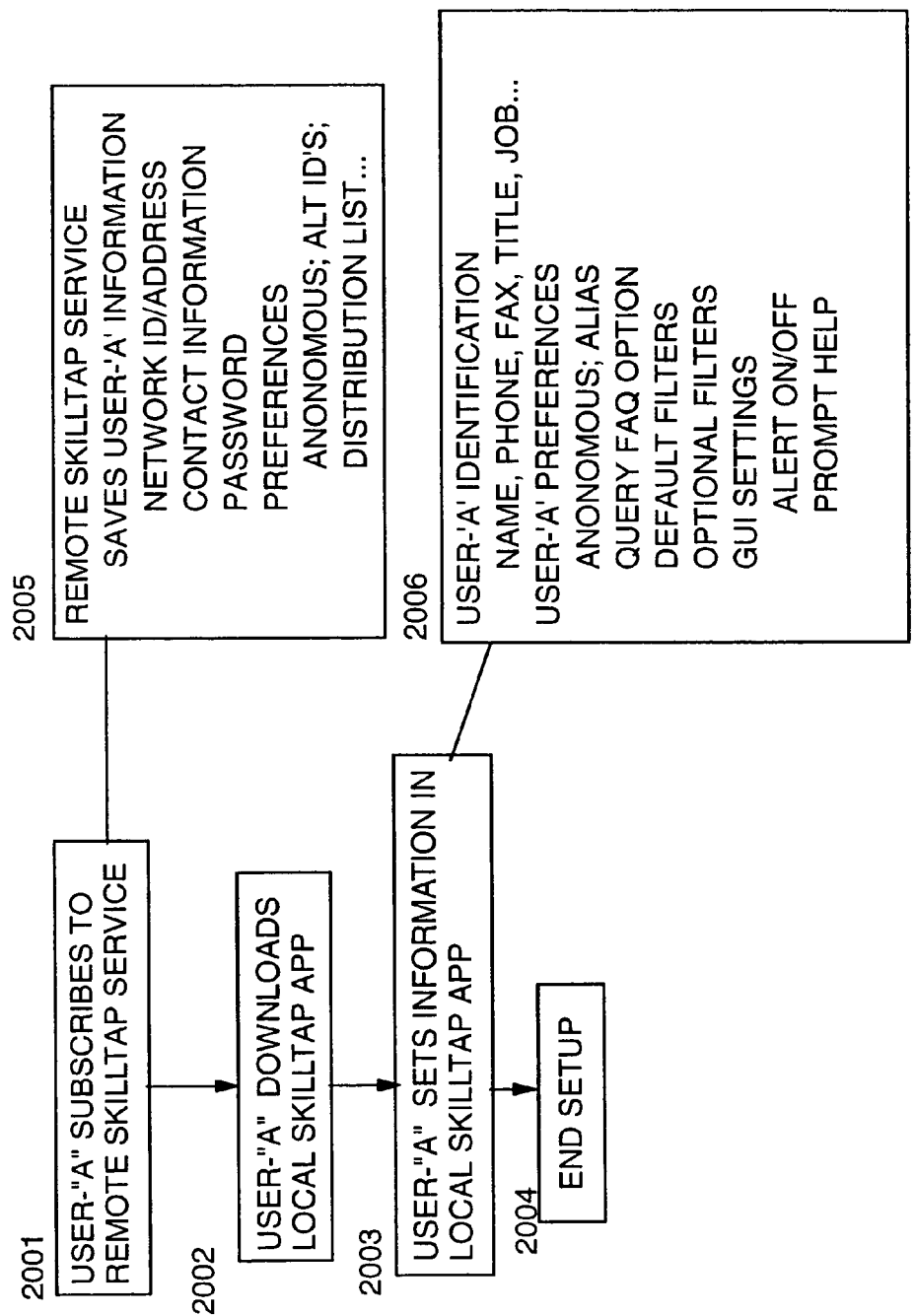
FIG. 20 is a flowchart expanding a setup scenario.

In FIG. 20, User "A" interacts 1901 2001 with a web based subscription service (or alternatively, after downloading Skilltap, opens the Skilltap GUI and uses it) to subscribe 2001 to the remote skilltap service 2005. The remote service in one embodiment saves information about User "A" during the subscription process. Such information as the user's network address/ID, contact information (telephone number, email . . . ), nickname, password, and preferences. Preferences include such things as: whether the user wants to be anonymous in transactions with other users in a skilltap session. Anonymity is maintained by skilltap by acting as a forwarding address for communication where skilltap supplies a temporary address/ID for others to use in communication with user "A"; Alternate ID's, where User "A" wishes to provide more than one network address/ID, and Distribution lists for SkillTap to forward messages to others to allow others to participate in the communication session or alternatively, for SkillTap to provide temporary subscription to a group so that the user can provide an adjunct list of group members. The user downloads a local skilltap application 2002 to his client if he hasn't already.

The local skilltap application is personalized 2003 with information 2006 useful for communications sessions. Information includes identifying information such as User "A"s Name, nickname, phone number(s), Fax number(s), Job Title, Expertise and the like. Local Skilltap also records the user's preferences for SkillTap such as if he wants anonymity or warning if he is about to break anonymity, his alias name, whether he wants to invoke a FAQ active agent robot as one of the recipients of his messages, default global filters for incoming messages, optional filters which can be invoked by a skilltap GUI may be nicknamed so the user associate their function easily. The Skilltap GUI settings identify whether the user wants to be alerted to incoming messages, whether he wants prompts and whether he wants a help function. The user then closes his setup GUI window 2004 and he is ready to go. In the preferred embodiment, anyone who wants to participate in SkillTap must download skilltap and perform the setup for their client. In another embodiment, Skilltap at the remote server, performs subscription and publishes IMs to subscribers who use standard IM applications to respond. The response IM is sent to the skilltap service as if it were the requester. The requester opens and closes an IM session with SkillTap as in other embodiments but in this embodiment, SkillTap service opens a second standard IM session to subscribers who respond in the second IM session. SkillTap then opens a third standard IM session with the initiator as a surrogate for the responder. The Skilltap service forwards the IM to the requester on behalf of the user. Thus, no local copy of skilltap is required.

Figure 21:
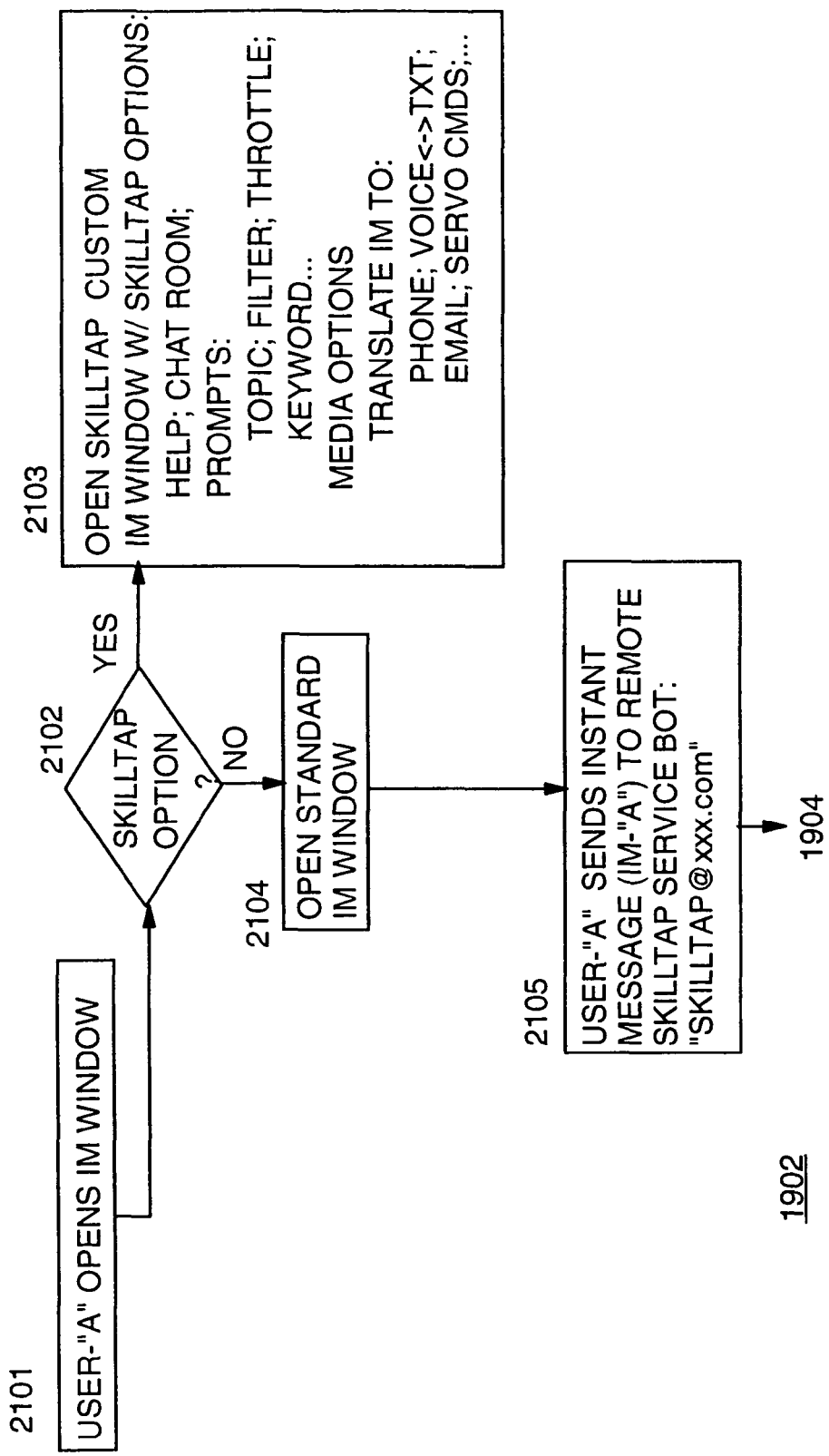
FIG. 21 is a flowchart expanding initiating a message to skilltap.

When User "A" wishes to initiate a conversation FIG. 21 with subscribers 1902 (send a request message: "Ask . . ."), he does so by sending a standard IM message 2105 to a Bot "SkillTap@xxx.com". The IM message is sent to an active agent in the SkillTap service via IM 2104. In another embodiment, the user can elect 2103 to have SkillTap provide a special GUI for IMs 2103. The special GUI provides IM services and SkillTap options. The options include Help, invoking a temporary chat room, prompting the initiator for such things as Topic of conversation, Filters and Throttles for response messages, Keyword prompts for special functions (Ask . . . ) also media options such as invoking a translator to allow IMs to translate to/from phones, Voice <-> Text; email, mechanical controls for automation of machines and any media available to one skilled in the art.

Figure 22:
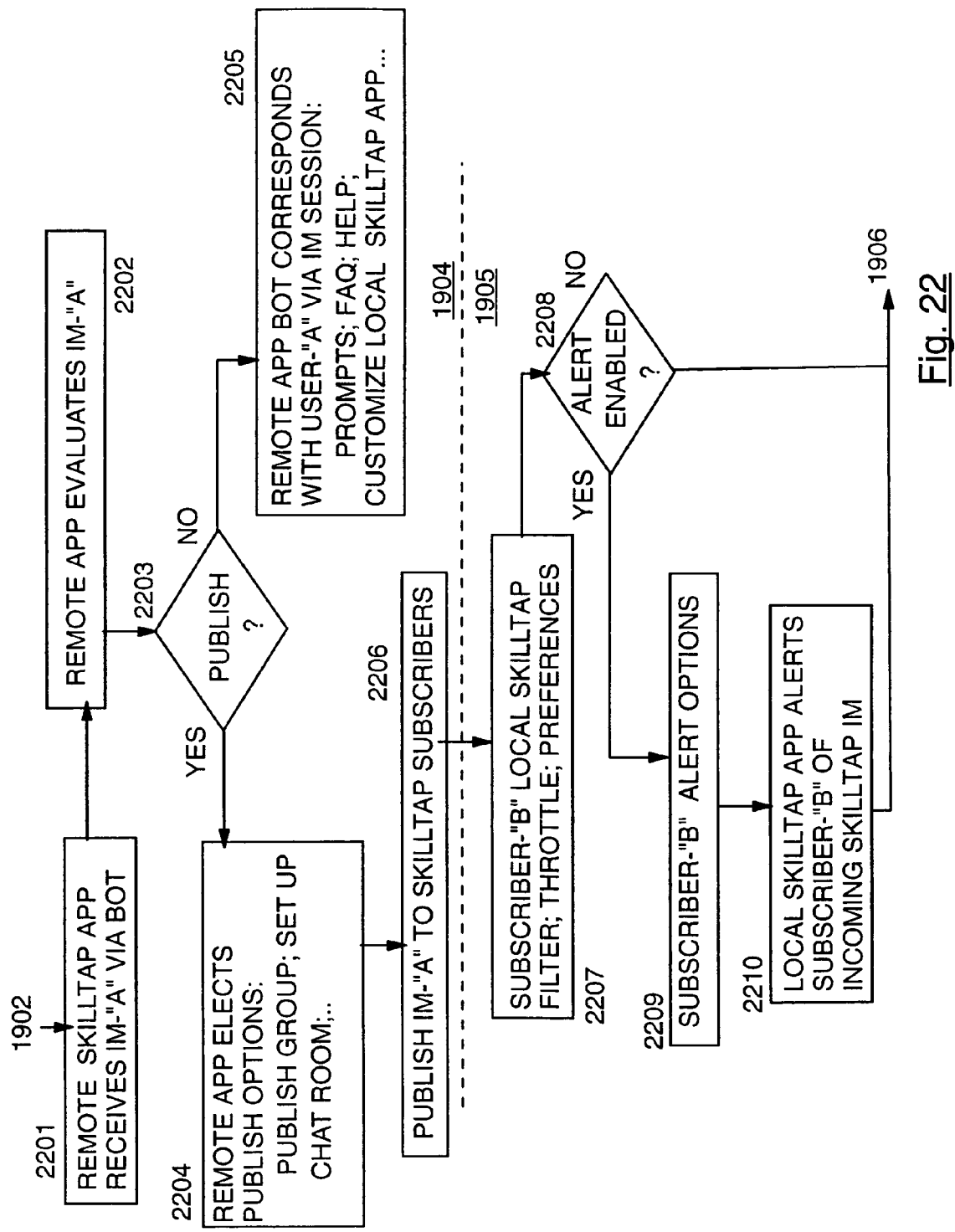
FIG. 22 is a flowchart expanding receiving an initiating message.

Referring to FIG. 22, the SkillTap service (Remote SkillTap App) receives the IM message "A" from User "A" 1903 2201 and evaluates the message 2202. SkillTap decides 2203 to either publish 2206 the message 2204 or not 2205. SkillTap retrieves the list of approved subscribers assigned to a channel which list includes the network address for the subscribers. Skilltap will publish IM message "A" to the addresses on the list. In one embodiment 2204, SkillTap publishes to a subscriber group or elects to create a Chat Room such that the User 'A' conversation can be joined by more than one Subscriber. Some IM messages to SkillTap 2205 may not be published but used by IM to converse with User "A". These IM conversations support such things as SkillTap Prompts for such things as how-to, SkillTap FAQ access, Help support, SkillTap Web masters, customizing of local SkillTap applications and plug-in requests. When IM message "A" is published to subscribers 2206, User "A" closes his IM session and waits for responders to initiate SkillTap IM sessions.

Subscriber "B" is one of the subscribers to the SkillTap channel User "A" is using. Subscriber "B" has setup his local SkillTap application (as described for User "A"0 1901) to Filter incoming messages, Throttle the incoming message activity and setup preferences for incoming communication. As part of the setup Subscriber "B" can elect to be warned of incoming messages by enabling 2208 an alert mechanism. In one embodiment, Alert options 2209 include whether the alert is an audible signal, a visual signal or a displayed icon.

When the Standard IM message "A" is published to Subscriber "B", the Local SkillTap application 1905 alerts 2210 him of the incoming message. The Alert in one embodiment is includes electing to display information about User "A", a Topic, or the full text message. A second alert in the embodiment (not shown) allows the user to elect whether or not to display other media such as a Browser URL site.

Figure 23:
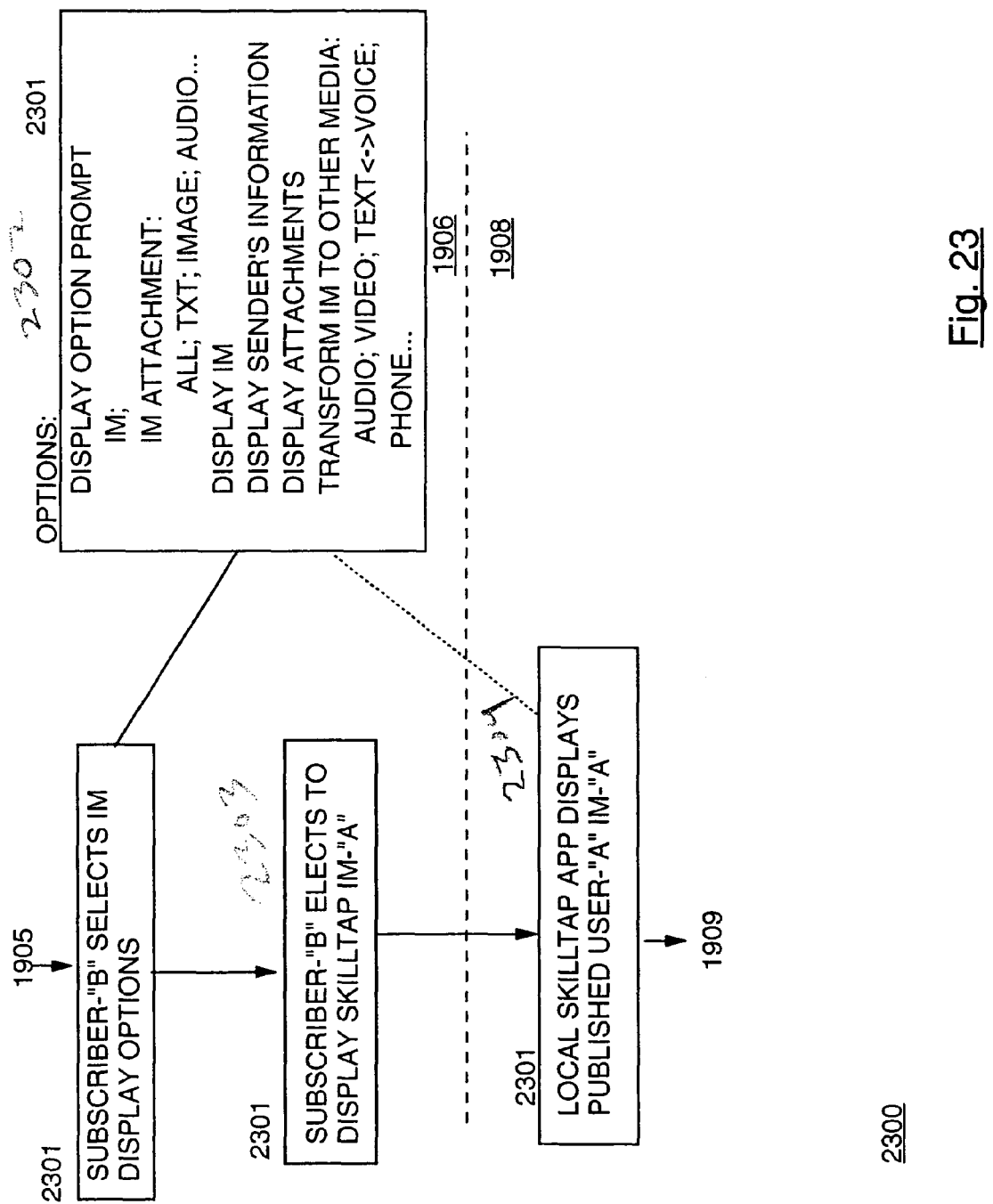
FIG. 23 is a flowchart expanding displaying an initiating message.

In FIG. 23, if the subscriber elects to display options (from the alert icon) 1906 2301, a GUI allow him to optionally select 2302 being prompted for display of the IM text, IM attachments (i.e., Text Files, Images, Audio, Video, Text <-> Voice . . . He can elect to display the IM messages, Display User "A" information (Name, title, job), or display of the IM text, IM attachments (i.e., Text Files, Images, Audio, Video, Text <-> Voice . . . Using the options, the Subscriber displays 2303 the incoming IM message "A" 1908 2304 in a Special SkillTap IM GUI window.

Figure 24:
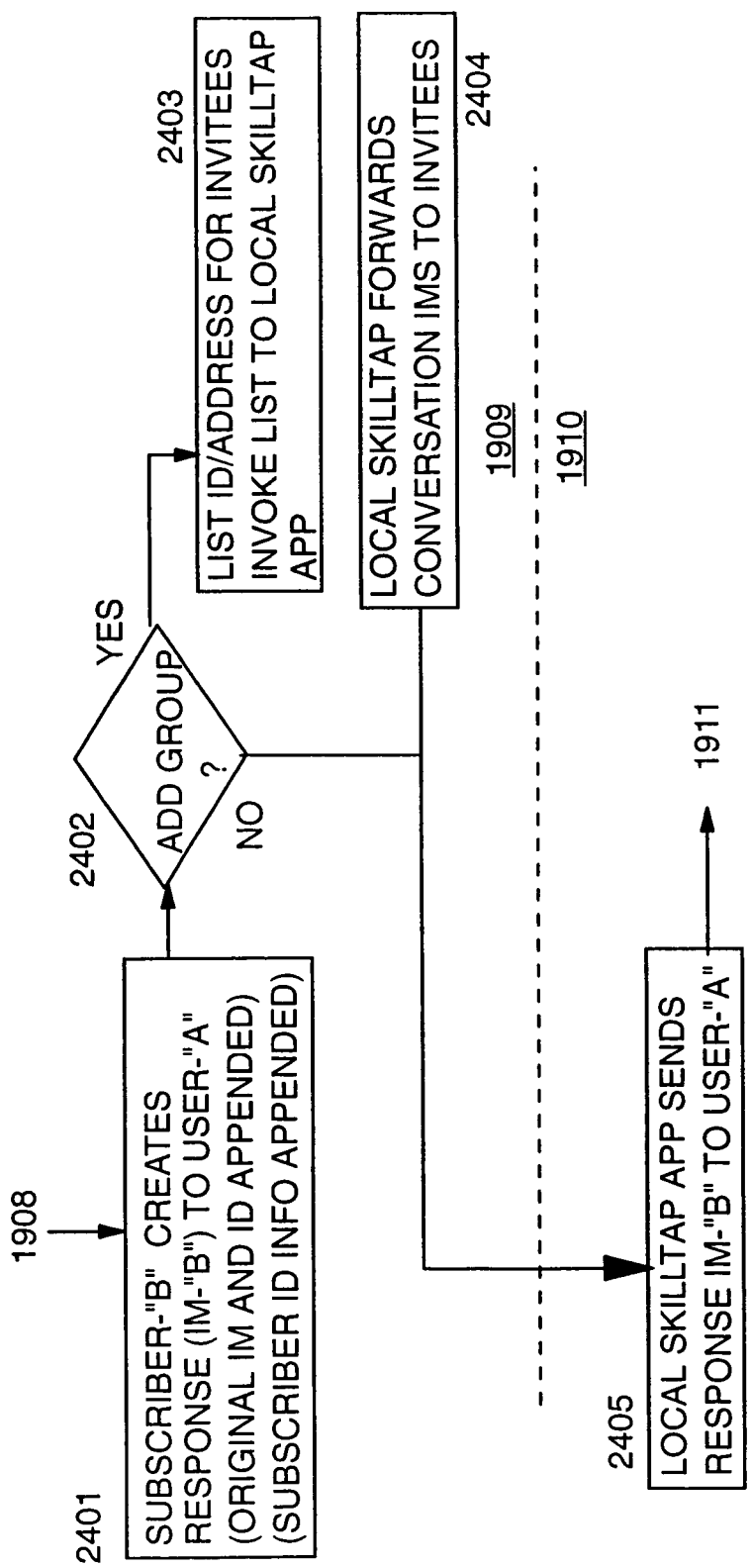
FIG. 24 is a flowchart expanding responding to an initiating message.

Subscriber "B" wishes to respond 1909 (join a conversation with User "A") FIG. 24, he types a response text and optionally attaches other media into the special GUI. The special GUI in a preferred embodiment appends the original message to the text and identifying information about the Subscriber (Name, Phone, Title . . . ) 2401. In one embodiment, the Subscriber elects 2402 to add a group distribution list to copy messages 2404 to other IM users for this conversation. In another embodiment, the Subscriber invokes a temporary Chat Room function for the conversation by way of his local SkillTap application. The subscriber's response is transmitted to User "A" 1910 2405.

Figure 25:
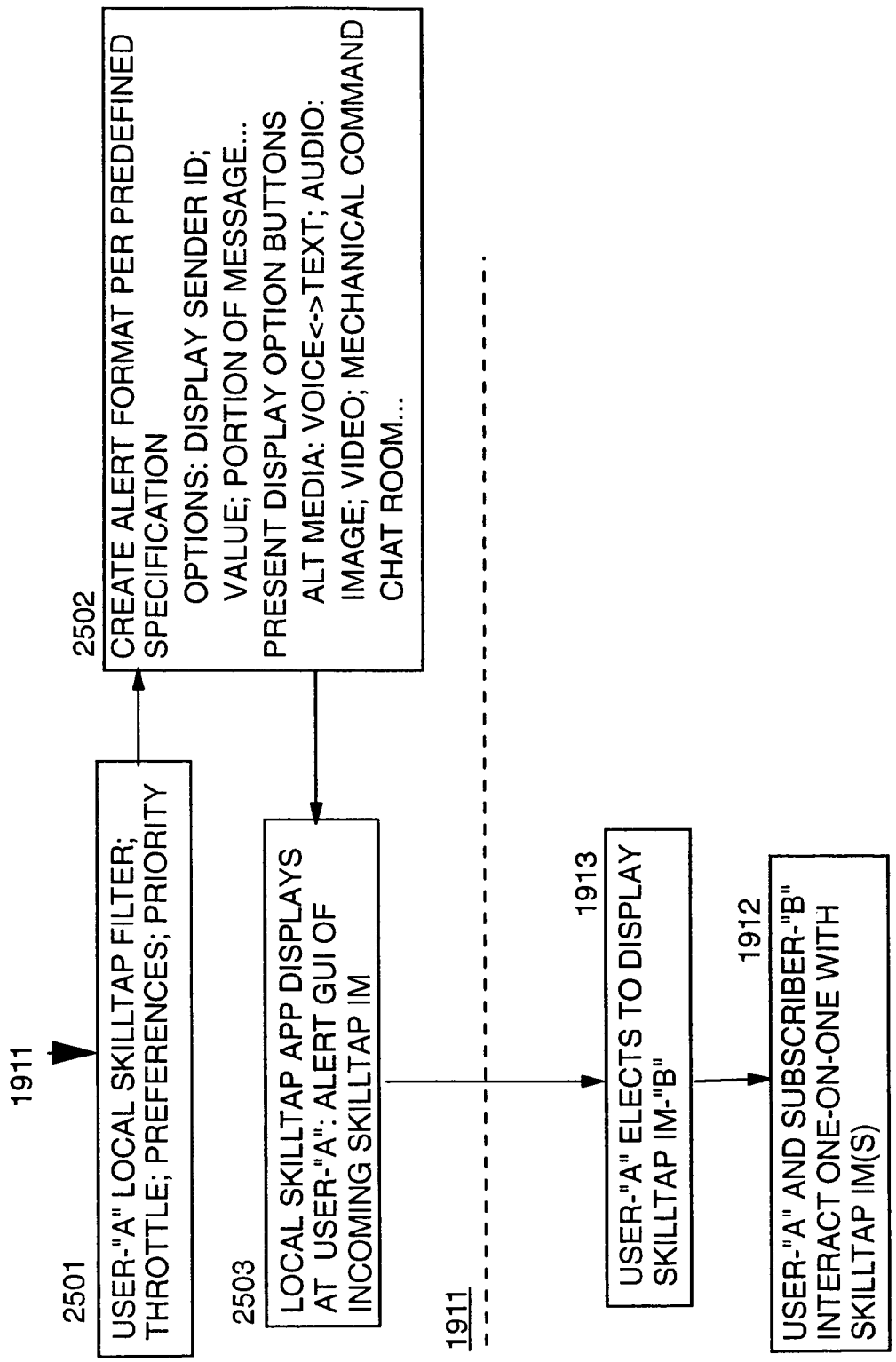
FIG. 25 is a flowchart expanding receiving response message.

In FIG. 25 1911, the response IM message "B" from Subscriber "B" SkillTap IM message "B" is operated on 2501 by Content Filters, Throttling techniques, User preferences and message priority. The preferences 2502 include customizing the special incoming alert message GUI and display options. Based on the options, a local SkillTap application presents an alert of an incoming SkillTap response IM 2503. If the User "A" elects to display the response skilltap IM message "B" and join the conversation with Subscriber "B" 1913, the one to one special IM conversation is begun 1912. During the conversation, the original IM is appended. If User "A" wishes to start a new session, he issues a standard IM to the SkillTap Bot and a new conversation window will be opened. For that matter, a separate conversation window is opened by an initial response from each subscriber. In another embodiment, a common window is opened for a session using Chat Room technology allowing the Initiator (User "A" to selectively allow more than one Subscriber to join the conversation in a common GUI window.

In one embodiment, an active agent responds to the publication of User "A"s initial message providing responses by querying a FAQ database. User "A" may or may not be informed that the responder is a robot Bot.

Figure 26:
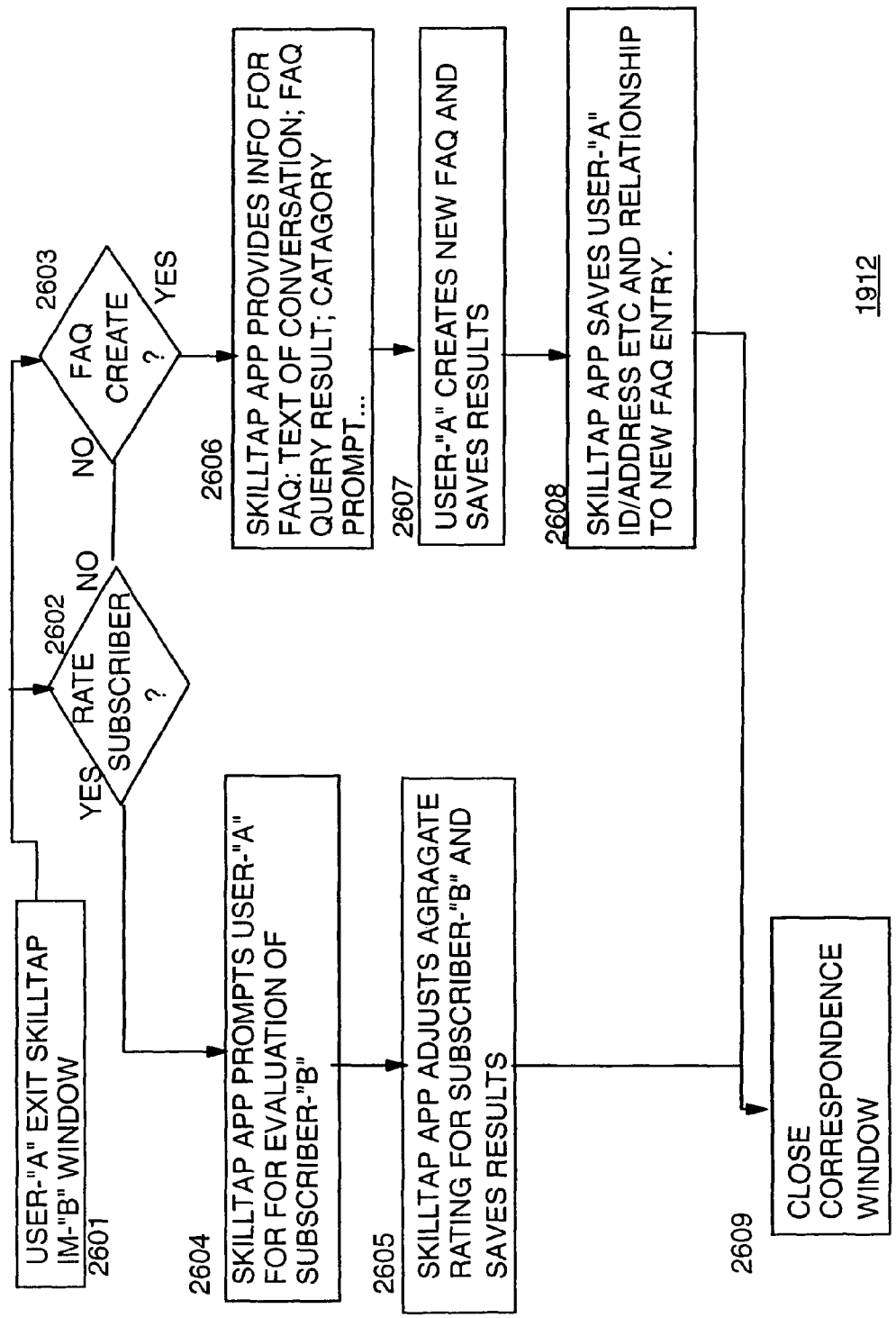
FIG. 26 is a flowchart expanding post correspondence options.

Referring to FIG. 26 at 1912, after User "A" has finished his conversation with Subscriber "B", he exits the special SkillTap GUI IM window 2601. SkillTap provides the option for User "A" to elect 2602 to evaluate Subscriber "B"s help and to elect 2603 to create a FAQ.

In rating the Subscriber, the SkillTap application prompts User "A" for evaluation categories and ratings 2604. SkillTap in a preferred embodiment, aggregates ratings for the subscriber (may be a simple averaging of scores accumulated from all requests to subscriber "B") into a single rating. This score is optionally presented with any response from Subscriber "B". It can also be used by filters to prioritize responses from subscribers. In one embodiment, evaluations of subscribers is also related to topic such that the same subscriber may have a value rating of 5 for computers and 3 for programs. The topics are pre-assigned by SkillTap.

If the user elects 2603 to create a FAQ, SkillTap provides an editable GUI containing the messages from the conversations from all subscribers responding to the request or in another embodiment 2606, the GUI only displays the Subscriber "B" information. The GUI can optionally display related FAQ information as a result of a user query and can prompt User "A" to step him through the FAQ creation steps. When the user is satisfied with his new FAQ entry, SkillTap saves the results 2607 in the FAQ database. In one embodiment 2608 SkillTap associates User "A" with the FAQ entry such that when the FAQ is queried in the future, the users can see who the expert was that created the entry and how to contact him (network ID/Address, Phone etc). When the user is done, he closes his special SkillTap conversation GUI window 2609.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for accessing a dynamic database accessible to a community of users, the method comprising the steps of:

receiving from a first user, a first electronic message directed through a pub/sub service including a channel having a topic of interest to a community of users who have anonymously subscribed to the channel, the first electronic message containing first information including a question related to the topic of interest of said channel;

querying the dynamic database responsive to the first electronic message received for locating an answer to the question in said first information and including said answer into a second information;

transmitting the second information to the first user, said second information being indistinguishable from messages from one of said anonymous subscribers; and publishing by way of the pub/sub service, the received first electronic message to the community of users such that any one of the community of users is able to respond to the first user with an answer to the question;

wherein the community of users includes a second user, the first electronic message received by each of said anonymous subscribers is identical, and the method comprising the further steps of:

filtering the first electronic message by each of said anonymous subscribers to filter the first electronic message for topics of specific interest to each of said anonymous subscribers, said first electronic message having to pass the filtering of the second user in order for the second user to see the question of the message;

receiving a response to the first electronic message from the second user after said filtering, the response comprising third information, the third information including an answer to the question in said first information; and responsive to receiving the response to the first electronic message, creating a uniquely identified electronic conversation session between the first user and the second user.

2. The method according to claim 1, comprising the further steps of:

creating fourth information from one or more of any one of user provided information, the first information or the second information; and storing fourth information in the dynamic database.

3. The method according to claim 2, comprising the further step of creating the fourth information from one or more of any one of user provided information, the first information or the second information.

4. The method according to claim 1, wherein the dynamic database is any one of a FAQ database, an active agent or a relational database.

5. The method according to claim 1, comprising the further steps of:

presenting the second information to the first user via a GUI interface;

presenting editing options to the first user via the GUI;

creating fifth information according to GUI directives from the first user, the GUI directives associated with a selected editing option; and selectively incorporating the fifth information in the dynamic database.

6. The method according to claim 5, comprising the further step of incorporating any one of the first information or the second information in the fifth information.

7. The method according to claim 1, comprising the further steps of:

presenting editing options to the first user via a GUI interface;

responsive to first user GUI actions, selecting sixth information in the dynamic database; and editing the sixth information in the dynamic database, the editing action comprising any one of selected text modification, selected text deletion or modification of a sixth information parameter.

8. The method according to claim 1, comprising the further steps of:

presenting the second information to the first user via a GUI interface; and presenting seventh information to the first user via the GUI interface, the seventh information comprising information from one or more previous queries.

9. A compute program product for accessing a dynamic database to a community of users, the program product comprising:

a non-transitory storage medium readable by a processing circuit and storing instructions for execution by the processing circuit for performing a method comprising the steps of:

receiving from a first user, a first electronic message directed through a pub/sub service including a channel having a topic of interest to a community of users who have anonymously subscribed to the channel, the first electronic message containing first information including a question related to the topic of interest of said channel;

querying the dynamic database responsive to the first electronic message received for locating an answer to the question in said first information and including said answer into a second information;

transmitting the second information to the first user, said second information being indistinguishable from messages from one of said anonymous subscribers; and publishing by way of the pub/sub service, the received first electronic message to the community of users such that any one of the community of users is able to respond to the firs user with an answer to the question;

wherein the community of users includes a second user, the first electronic message received by each of said anonymous subscribers is identical, and the method comprising the further steps of:

filtering the first electronic message by each of said anonymous subscribers to filter the first electronic for topics of specific interest to each of said anonymous subscribers, said first electronic message having to pass the filtering of the second user in order for the second user to see the question of the message;

receiving a response to the first electronic message from the second user after said filtering, the response comprising third information which includes an answer to said question contained in said first information; and responsive to receiving the response to the first electronic message, creating a uniquely identified electronic conversation session between the first user and the second user.

10. The computer program product according to claim 9, comprising the further steps of:

creating fourth information from one or more of any one of user provided information, the first information or the second information; and storing the fourth information in the dynamic database.

11. The computer program product according to claim 9, comprising the further steps of:

presenting the second information to the first user via a GUI interface; presenting editing options to the first user via the GUI;

creating fifth information according to GUI directives from the first user, the GUI directives associated with a selected editing option; and selectively incorporating the fifth information in the dynamic database.

12. The computer program product according to claim 9, comprising the further steps of:

presenting editing options to the first user via a GUI interface;

responsive to first user GUI actions, selecting sixth information in the dynamic database; and editing the sixth information in the dynamic database, the editing action comprising any one of selected text modification, selected text deletion or modification of a sixth information parameter.

13. The computer program product according to claim 9, comprising the further steps of:

presenting the second information to the first user via a GUI interface; and presenting seventh information to the first user via the GUI interface, the seventh information comprising information from one or more previous queries.

14. A system for accessing a dynamic database accessible to a community of users, the system comprising:

a network;

a server system in communications with the network;

a client system in communication with the server system via the network wherein the system includes instructions to execute a method comprising the steps of:

receiving from a first user, a first electronic message directed through a pub/sub service including a channel having a topic of interest to a community of users who have anonymously subscribed to the channel, the first electronic message containing first information including a question related to the topic of interest of said channel;

querying the dynamic database responsive to the first electronic message received for locating an answer to the question in said first information and including said answer into a second information;

transmitting the second information to the first user, said second information being indistinguishable from messages from one of said anonymous subscribers; and publishing by way of the pub/sub service, the received first electronic message to the community of users such that any one of the community of users is able to respond to the first user with an answer to the question;

wherein the community of users includes a second user, the first electronic message received by each of said anonymous subscribers is identical, and the system further comprises a filter for each of said anonymous subscribers filtering the first electronic message by each of said anonymous subscribers for topics of specific interest to each of said anonymous subscribers, said first electronic message having to pass the filtering of the second user in order for the second user to see the question of the message; and said method further comprising:

receiving a response to the first electronic message from the second user, the response comprising third information which includes an answer to said question contained in said first information; and responsive to receiving the response to the first electronic message, creating a uniquely identified electronic conversation session between the first user and the second user.

15. The system according to claim 14, comprising the further steps of:

creating fourth information from one or more of any one of user provided information, the first information or the second information; and storing the fourth information in the dynamic database.

16. The system according to claim 14, comprising the further steps of:

presenting the second information to the first user via a GUI interface;

presenting editing options to the first user via the GUI;

creating fifth information according to GUI directives from the first user, the GUI directives associated with a selected editing option; and selectively incorporating the fifth information in the dynamic database.

17. The system according to claim 14, comprising the further steps of:

presenting editing options to the first user via a GUI interface;

responsive to first user GUI actions, selecting sixth information in the dynamic database; and editing the sixth information in the dynamic database, the editing action comprising any one of selected text modification, selected text deletion or modification of a sixth information parameter.

\* \* \* \* \*